US010902270B2

(12) United States Patent
Mishra et al.

(10) Patent No.: US 10,902,270 B2
(45) Date of Patent: Jan. 26, 2021

(54) MACHINE LEARNING PLATFORM FOR PERFORMING LARGE SCALE DATA ANALYTICS

(71) Applicant: Miovision Technologies Incorporated, Kitchener (CA)

(72) Inventors: Akshaya K. Mishra, Kitchener (CA); Nicholas Miller, Kitchener (CA); Justin A. Eichel, Waterloo (CA); Nicholas Jankovic, Waterloo (CA); Kurtis N. McBride, Kitchener (CA); Anthony I. Brijpaul, Waterloo (CA)

(73) Assignee: Miovision Technologies Incorporated, Kitchener (CA)

( * ) Notice: Subject to any disclaimer, the term of this patent is extended or adjusted under 35 U.S.C. 154(b) by 62 days.

(21) Appl. No.: 15/382,130

(22) Filed: Dec. 16, 2016

(65) Prior Publication Data

US 2017/0103267 A1    Apr. 13, 2017

Related U.S. Application Data

(63) Continuation of application No. PCT/CA2015/050558, filed on Jun. 18, 2015.
(Continued)

(51) Int. Cl.
*G06K 9/00* (2006.01)
*G06N 20/00* (2019.01)
*G06K 9/62* (2006.01)

(52) U.S. Cl.
CPC ..... *G06K 9/00785* (2013.01); *G06K 9/00973* (2013.01); *G06K 9/6254* (2013.01); *G06K 9/6256* (2013.01); *G06N 20/00* (2019.01)

(58) Field of Classification Search
None
See application file for complete search history.

(56) References Cited

U.S. PATENT DOCUMENTS

| 5,619,589 A | 4/1997 | Otsu et al. |
| 6,941,287 B1 | 9/2005 | Vaidyanathan et al. |

(Continued)

OTHER PUBLICATIONS

Sharma et al.; "Robust pose invariant face recognition using coupled latent space discriminant analysis"; Computer Vision and Image Understanding; vol. 116, No. 11; pp. 1095 to 1110; Aug. 2012.

(Continued)

*Primary Examiner* — Andrae S Allison
(74) *Attorney, Agent, or Firm* — CPST Intellectual Property Inc.; Brett J. Slaney

(57) ABSTRACT

To address problems that video imaging systems and platforms face when analyzing image and video content for detection and feature extraction, a solution is provided in which accumulating significant amounts of data suitable for training and learning analytics is leveraged to improve over time, the classifiers used to perform the detection and feature extraction, by employing a larger search space and generate additional and more complex classifiers through distributed processing. A distributed learning platform is therefore provided, which is configured for operating on large scale data, in a true big data paradigm. The learning platform is operable to empirically estimate a set of optimal feature vectors and a set of discriminant functions using a parallelizable learning algorithm. A method of adding new data into a database utilized by such a learning platform is also provided. The method comprises identifying an unrepresented sample space; determining new data samples associated with the unrepresented sample space; and adding the new data samples to the database.

26 Claims, 18 Drawing Sheets

Related U.S. Application Data

(60) Provisional application No. 62/014,898, filed on Jun. 20, 2014.

(56) References Cited

U.S. PATENT DOCUMENTS

| | | | |
|---|---|---|---|
| 7,082,394 B2 | 7/2006 | Burges et al. | |
| 9,324,022 B2* | 4/2016 | Williams, Jr. | ........ G06N 3/0454 |
| 9,830,529 B2* | 11/2017 | Jetley | .................... G06N 3/0454 |
| 10,475,165 B2* | 11/2019 | Vogels | ...................... G06N 3/08 |
| 10,606,982 B2* | 3/2020 | Guo | ...................... G06K 9/6267 |
| 10,607,393 B2* | 3/2020 | Petkov | .................... A61B 6/037 |
| 2008/0059051 A1 | 3/2008 | Kumagai et al. | |
| 2011/0109476 A1* | 5/2011 | Porikli | ................. G06K 9/3241 |
| | | | 340/905 |
| 2013/0132331 A1* | 5/2013 | Kowalczyk | ............ G16B 40/00 |
| | | | 706/52 |
| 2013/0138589 A1* | 5/2013 | Yu | ............................ G06N 3/08 |
| | | | 706/25 |
| 2013/0204810 A1 | 8/2013 | Moringa et al. | |
| 2014/0003708 A1* | 1/2014 | Datta | ................. G06K 9/00758 |
| | | | 382/159 |
| 2015/0294191 A1* | 10/2015 | Zhang | .................... G06N 20/00 |
| | | | 382/160 |
| 2016/0063357 A1* | 3/2016 | Gao | ....................... G06N 20/00 |
| 2018/0018579 A1* | 1/2018 | Xu | ......................... G06N 20/20 |

OTHER PUBLICATIONS

Hare et al.; "Struck: Structured Output Tracking with Kernels"; IEEE International Conference on Computer Vision (ICCV); IEEE; pp. 1 to 8; Dec. 31, 2011.

Yeow, L.; International Search Report from corresponding PCT Application No. PCT/CA2015/050558; search completed Sep. 10, 2015.

\* cited by examiner

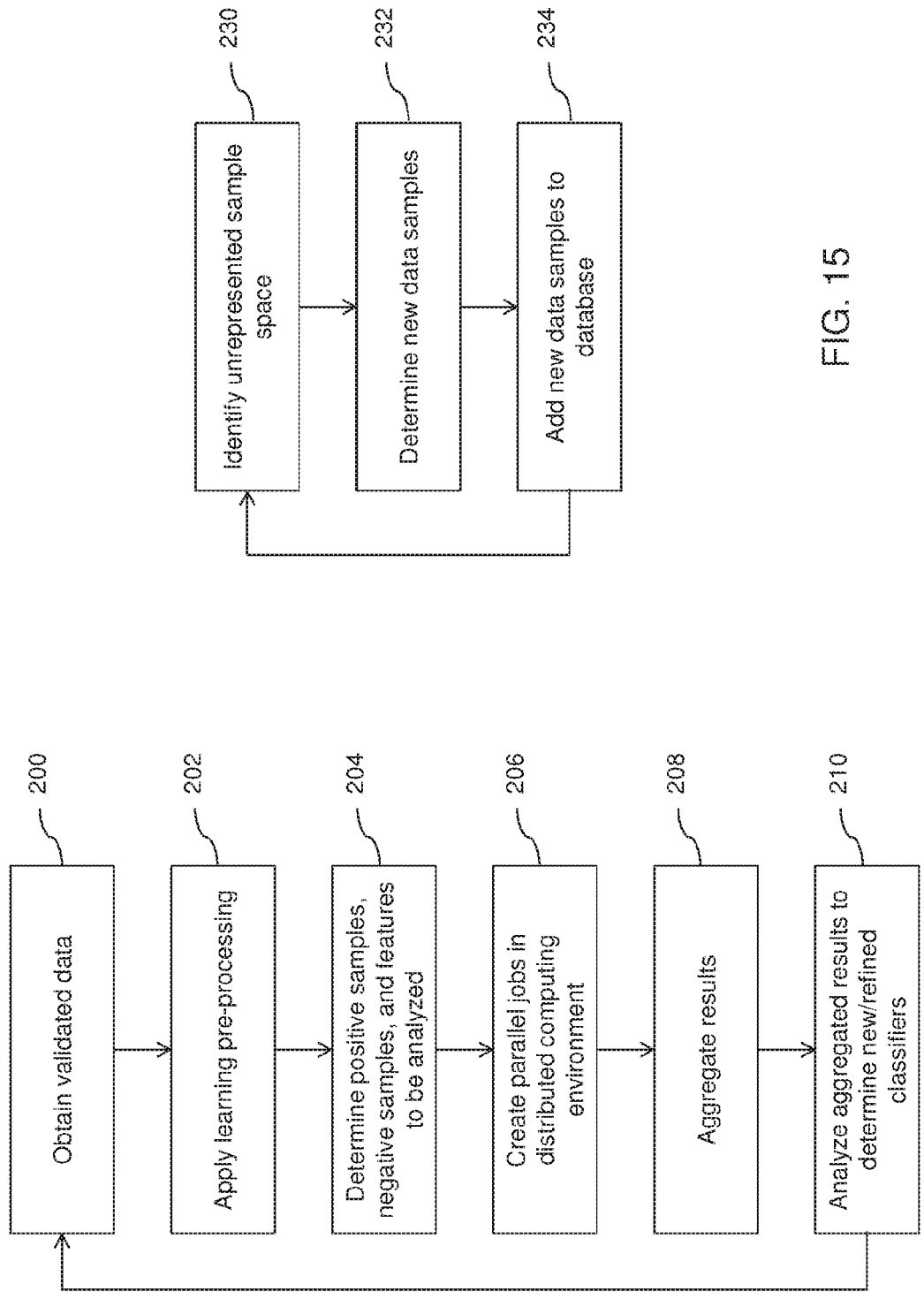

MACHINE LEARNING PLATFORM FOR PERFORMING LARGE SCALE DATA ANALYTICS

The present application is a continuation of PCT Application No. PCT/CA2015/050558 filed on Jun. 18, 2015, which claims priority to U.S. Provisional Application No. 62/014,898 filed on Jun. 20, 2014, both incorporated herein by reference.

TECHNICAL FIELD

The following relates to machine learning platforms for performing large scale data analytics.

DESCRIPTION OF THE RELATED ART

Having the ability to understand a scene (e.g., in a video or image) to extract meaningful events is becoming of great interest in various fields, such as activity detection, surveillance, traffic parameter estimation, navigation, etc. Several techniques have been developed for understanding a scene, at least some of which have described static scenes for applications in content based image and video retrieval.

Video imaging vehicle detection systems (VIVDS) are now common in the traffic industry, where vehicle detection typically employs background subtraction and blob tracking. Simple implementations can have drawbacks including false vehicle detections due to lighting changes and ghosting in the background subtraction. Furthermore, many VIVDS have strict constraints on scene perspective, necessitating the installation of multiple cameras for each intersection being monitored. The use of multiple cameras increases the capital and maintenance costs, which making deployments more prone to error. Similar drawbacks can also be found in image processing applied in other fields.

In order to apply computer vision to classify objects of interest, the computer first obtains some understanding of the object properties. Typically, measurements of the object are processed and converted into a set of features. Then, the computer vision classifier uses the features to classify the object of interest into two or more categories, which may or may not be predetermined. The learning infrastructure is used to teach the classifier how to categorize these objects. For the case of supervised learning, the learning infrastructure is given examples of objects for each category. If too few examples are given, the resulting classifier may perform poorly since the learning system does not have sufficient sample data to generalize. For example, several data samples of chairs might not be representative of all chairs and their derivatives, e.g. stools, office chairs, kitchen chairs, or car seats. If too few features are given, the classifier may become overly complex since there are too few features to separate data samples into multiple categories. For example, a single feature, such as weight, may be able to separate small apples and large oranges, but this single feature is likely insufficient to distinguish large apples and small oranges.

SUMMARY

While at least some existing algorithms are capable of handling thousands of data samples and hundreds of features, these system are found to be unsuitable for scaling to much larger data sets (e.g., with trillions of data samples and billions of features). A large scale learning platform is described below, in order to address this scaling issue by distributing learning algorithms over a cluster of processors.

In one aspect, there is provided a distributed learning platform configured for operating on large scale data, the learning platform operable to empirically estimate a set of optimal feature vectors and a set of discriminant functions using a parallelizable learning algorithm.

In another aspect, there is provided a method of performing distributed learning, the method comprising: obtaining validated data having been subjected to at least one feature analysis; applying at least one pre-processing operation on the validated data; determining a set of positive samples, a set of negative samples, and a set of features to be analyzed; creating parallel jobs in a distributed computing environment having a plurality of computing resources; aggregating results from the plurality of computing resources; and analyzing the aggregated results to determine at least one new classifier or at least one refined classifier.

In yet another aspect, there is provided a method of adding new data into a database utilized by a learning platform, the method comprising: identifying an unrepresented sample space; determining new data samples associated with the unrepresented sample space; and adding the new data samples to the database.

BRIEF DESCRIPTION OF THE DRAWINGS

Embodiments will now be described by way of example only with reference to the appended drawings wherein:

FIG. 14 is a flow chart illustrating computer executable operations for performing large scale data analytics using a learning platform;

FIG. 15 is a flow chart illustrating computer executable operations for adding new data samples to a database using a learning platform;

DETAILED DESCRIPTION

Figure 1A:
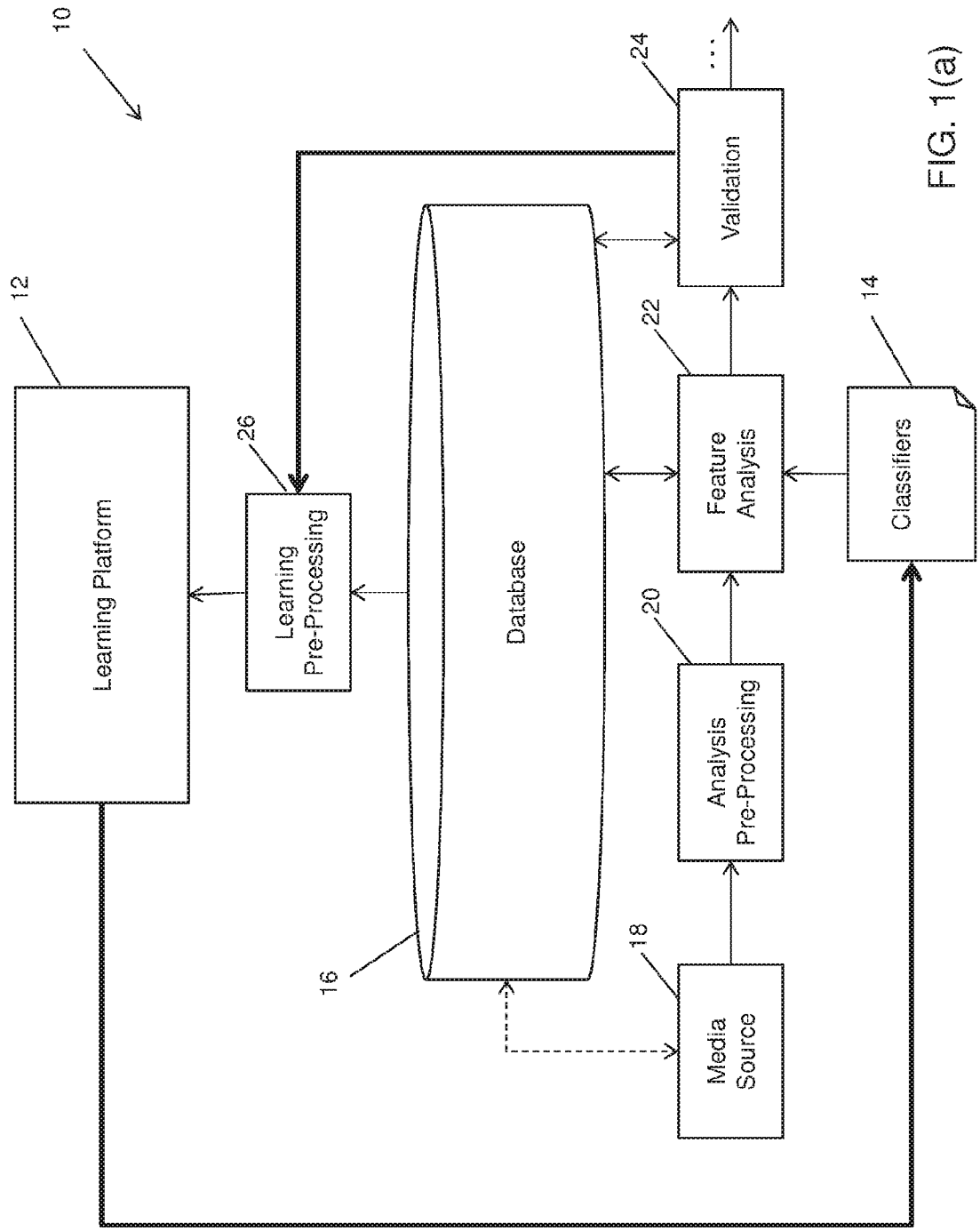
FIG. 1(a) is a schematic block diagram illustrating an analysis environment including a learning platform.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

The examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that video imaging systems and platforms which analyze image and video content for detection and feature extraction can accumulate significant amounts of data suitable for training and learning analytics that can be leveraged to improve over time the classifiers used to perform the detection and feature extraction by employing a larger search space and generating additional and more complex classifiers through distributed processing.

FIG. 1(a) illustrates a video analysis environment 10 which includes a learning platform 12 to generate and/or improve a set of classifiers 14 used in analyzing video content, e.g., for detection and extraction of features within image frames of a video. The learning platform 12 can be operable to produce classifiers 14 that operate in real-time, e.g., through feature dimensionality reduction. The analysis of the video content in this example is performed for an application independent of the training and learning performed by the learning platform 12 and generates analyses results that are stored in a database 16. In this example, one or more media sources 18 provides media content (e.g., video) to an analysis pre-processing stage 20 to prepare the media for a feature analysis stage 22. The feature analysis stage 22 can include automatic processes, semi-automatic processes, manual processes, and any combination thereof. The results of the feature analysis stage 22 are validated in a validation stage 24, which can be performed manually by analysts responsible for accepting or rejecting the results of the feature analyses (e.g., to identify misclassified objects). As shown in FIG. 1(a), the results of the validation state 24 can be fed back into the learning platform 12 to enable supervised learning. It can be appreciated that, while not illustrated in FIG. 1(a), non-validated data obtained prior to the validation stage 24 can also be used by the learning platform 12 as an unsupervised learning mechanism.

The database 16 is populated with feature analysis results and validation results for a plurality of projects, clients, etc., performed over time to continually accumulate analyzed and validated/rejected items/value/data points that can be leveraged by the learning platform 12 to periodically or continually refine and improve the classifiers 14 that are used in conducting the feature analyses. It can be appreciated that the learning platform 12 can operate independently of the feature analyses being conducted in an "offline" learning and training, or can operate in real-time while analyses are being conducted when the particular application permits.

Such offline learning can be supervised or unsupervised. Supervised learning typically requires at least some ground-truth labelled data, which can be stored in a dataset or be the output of a validation algorithm. Unsupervised learning requires only data from a database, not requiring validation. In the present example, the learning platform 12 can be given training data and labelled ground truth in a supervised learning mode, which could be stored in the database 16 or be obtained from the output of the validation stage 24. The learning platform 12 then determines parameters for a classifier. In at least one example, the trained classifier can be executed over the dataset on non-labelled data. A human user can validate the output and provide negative feedback to the algorithm when the algorithm performs poorly. This feedback is stored in a dataset and the classifier is retrained using the learning platform 12. In supervised learning, the goal is typically to label scenic elements and perform object detection.

The learning platform 12 can also be given training data with no labelled ground truth data in an unsupervised learning mode, which therefore does not include or otherwise consider the validation stage 24. The learning platform 12 determines parameters for a classifier that tries to detect patterns in the data through a process referred to as clustering. The classifier can then group new data into these clusters. In at least some examples, as new data is collected, the classifier can be retrained and thus determine how to cluster all of the data. Also, through feedback in supervised learning, a human can label, merge or split such clusters. In unsupervised learning, the goal is typically to identify groups sharing common traits, for given input data.

As illustrated in FIG. 1(a), the data obtained from the database 16 typically undergoes at least some learning pre-processing 26. For training purposes, in one example where the media is video, the video is decoded from a queue or other storage area, with associated meta data and configuration settings. The decoded video and additional data is sent to the learning pre-processing 26, where rectification and filtering occur to prepare one or more images. The rectification normalizes the video specifically for training to allow each vehicle to be a constant height and width, and allow it to travel from left to right within the image frame. This type of pre-processing is designed to block for variables, e.g. block for lane orientation and scale. Once the video has been trained, the parameters used to detect and analyze scene objects are returned from the learning platform 12 to the set of classifiers 14, and used in the feature analysis stage 22, e.g., for subsequent analyses and/or to improve previous analyses.

Accordingly, the feature analysis stage 2, which is configured to perform specific analytics for particular applications (e.g., video counting, event detection, etc.) requires parameters to perform the analysis with at least some accuracy. The parameters can be predefined in any suitable manner. The analysis environment 10 shown in FIG. 1(a) incorporates a learning platform 12 that is capable of creating and/or refining the parameters through large scale data training.

Figure 1B:
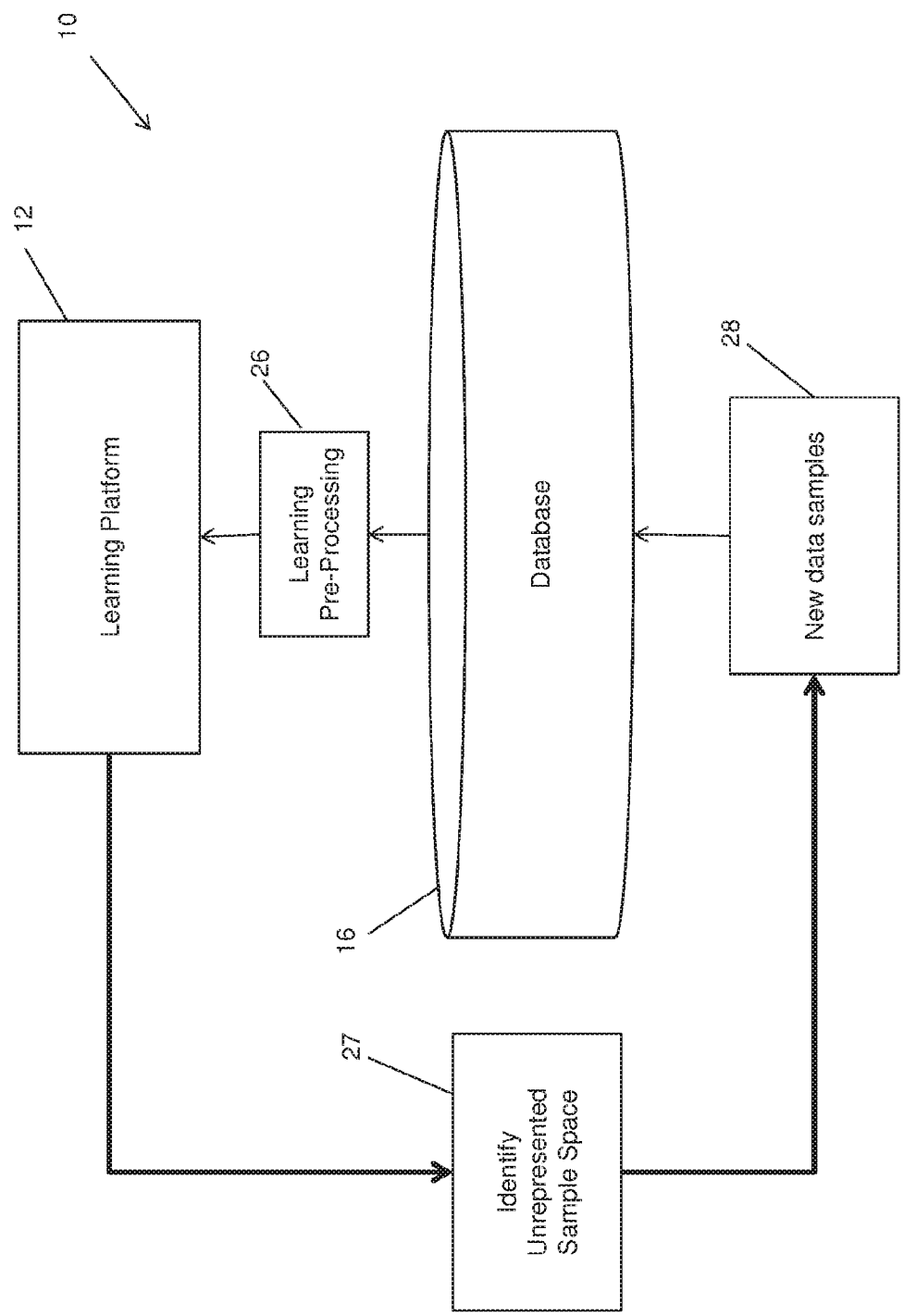
FIG. 1(b) is a schematic block diagram of a learning platform configured to add new data to a database.

FIG. 1(b) illustrates another configuration of the learning platform 12 in which new data is incorporated into the database 16. The learning platform 12 identifies unrepresented sample spaces at 27 and new samples are added to the database at 28 based on this identification. This configuration can continue to iteratively add new data samples back into the learning platform 12. The unrepresented sample space can be determined by identifying edge cases where the classifier created by the learning platform 12 does not generalize sufficiently to separate classes. These edge cases can be found by observing where the trained classifier fails to correctly label an object. The user can then add additional edge case representative data to the learning platform 12, or select a different type of classifier that may generalize better. For example, a passenger vehicle trained on data samples in warm climates may not contain data samples associated with snow or ice and may consequently fail to distinguish a snow covered vehicle from snow covered roadway unless snow covered vehicles are added to the learning system.

Figure 2:
FIG. 2 illustrates image samples including positively identified vehicles.
Figure 3:
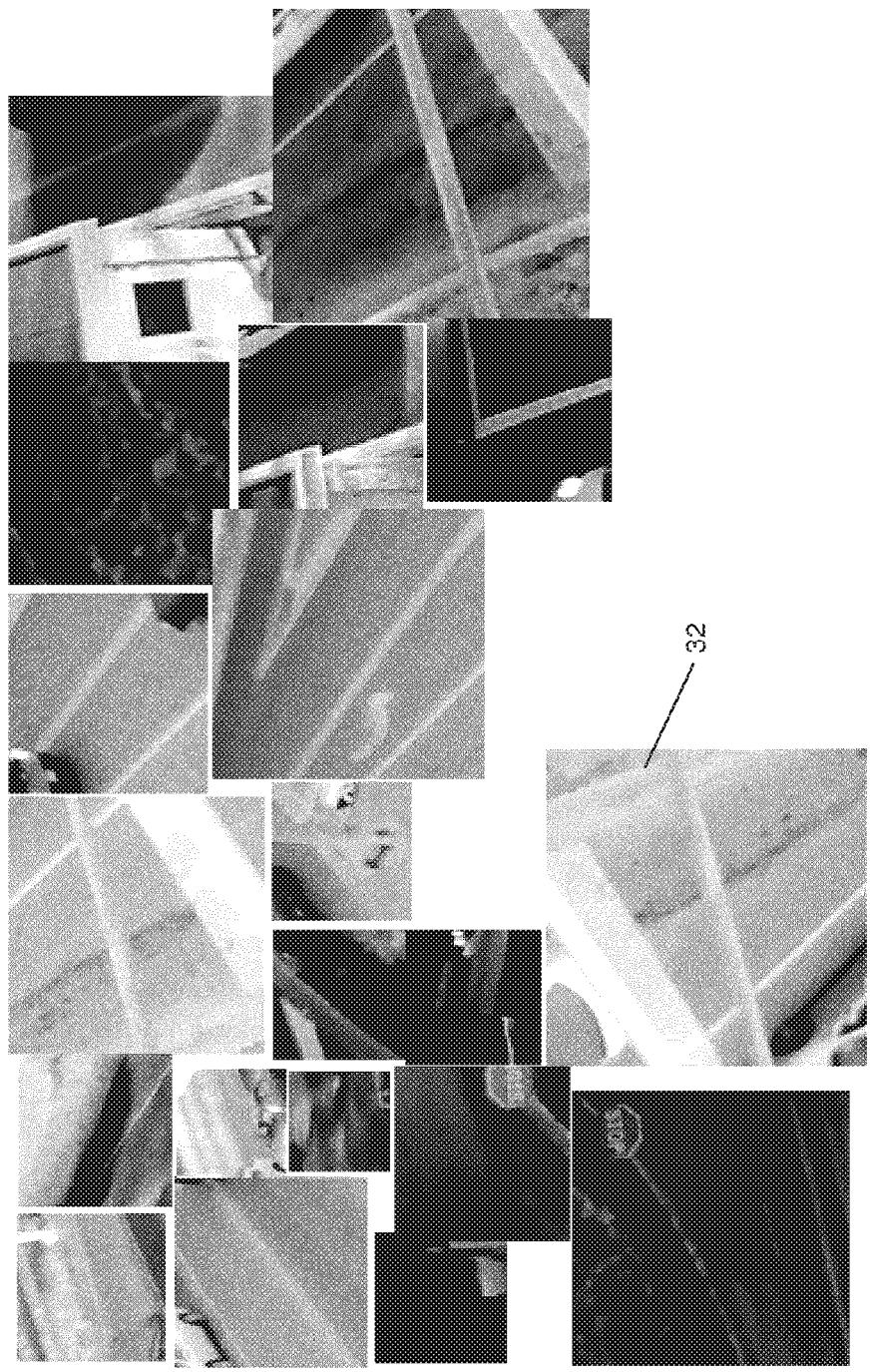
FIG. 3 illustrates image samples including negatively identified vehicles.

FIGS. 2 and 3 illustrate samples of images processed in a VIVDS. In FIG. 2, a number of positive samples 30 are shown, and in FIG. 3 a number of negative samples 32 are shown, representing non-positive objects. If the learning platform 12 is estimating parameters for a passenger vehicle classifier, the negative examples would include non-passenger vehicles such as trucks, buses, trees, roadways, etc. It has been recognized that the validation stage 24 provides meaningful data in the database 16 for determining the accuracy of the classifiers 14 used to correctly or incorrectly detect the object of interest. This meaningful data, processed on a large scale, allows the learning platform 12 to train the analysis system to which it is coupled towards better classifiers for the object being detected.

For example, when training a classifier to identify objects within a video, a significant number (e.g., millions or billions) of features can be utilized as inputs into the large scale training infrastructure that could represent both spatial and temporal object characteristics, e.g. multi-scale spatiotemporal Haar features, along with billions to trillions of positive and negative object samples, from which the features are derived. The resulting classifier has parameters estimated from a larger sample size than is possible without a large scale learning infrastructure and consequently has increased accuracy at classifying similar objects, since more edge cases are used in learning. The resulting classifier may also have far fewer significant features required for classification and feature reduction applied where insignificant features can be discarded as part of the learning system, e.g. the learning infrastructure may reduce millions of arbitrary features to tens of useful features.

Figure 4:
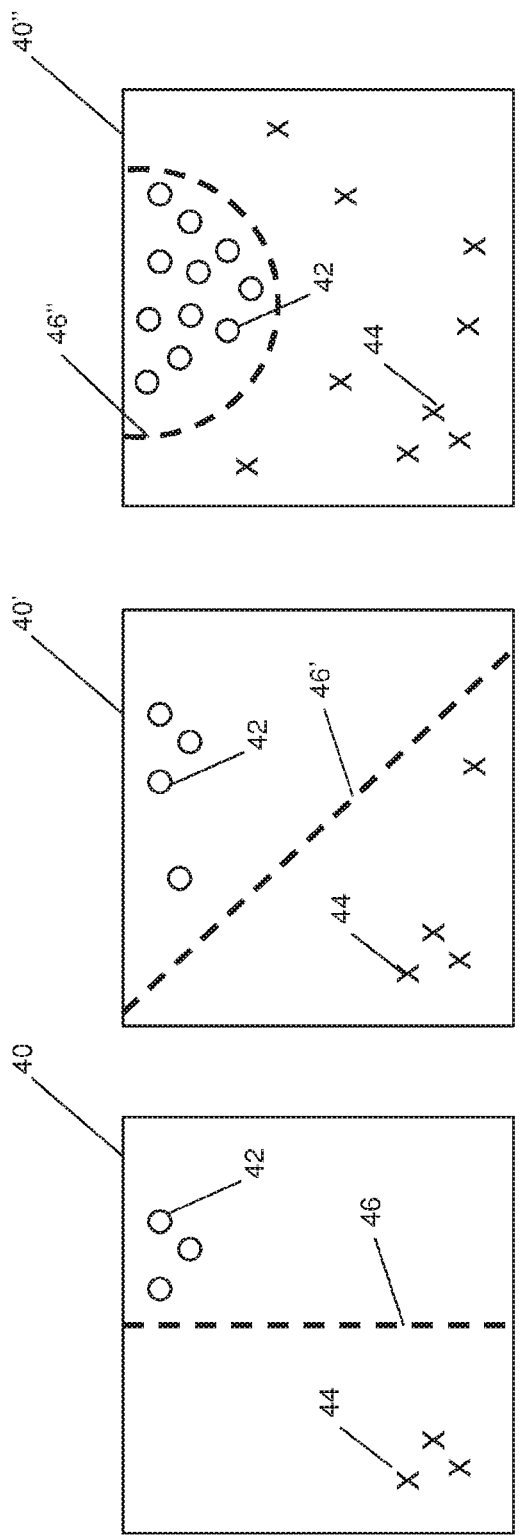
FIG. 4 illustrates a series of thresholds for classifying positive and negative samples.

FIG. 4 illustrates a series of sample spaces 40, 40', 40" illustrating how a classifier 14 can be trained to more accurately classify an object through the use of progressively more complicated features. For the purpose of this illustration, a single classifier 14 can contain many discriminants, which can utilize one or more features. A classifier 14 labels objects using features derived from object measurements. For example, a vehicle classifier, implemented using Adaboost (illustrated below), detects and labels vehicles using a sub-set of Haar features calculated from pixel intensities contained within an image sequence. In FIG. 4, the labels "x" and "o" represent two classes of objects. The features in view (a) are classified according to the x coordinate, and in views (b) and (c), classified using the x and y coordinates. In view (a), with relatively few positive samples 42 and relatively few negative samples 44, a one-dimensional linear threshold 46 could be selected since there is an area between the clusters of samples 42, 44 in which could represent a threshold boundary. However, as illustrated in view (b), with additional positive samples 42 and negative samples 44, the one-dimensional threshold 46 would not have the same level of accuracy as in view (a) and thus would need to be refined to generate a two-dimensional linear threshold 26' that would more accurately classify the set of samples. With even more samples, as shown in view (c), a parabolic threshold 26' could be determined that can completely separate the negative samples 44 from the positive samples 42. As such, it can be appreciated that the thresholds used to determine positive from negative samples can be continuously refined through the addition of greater numbers of features and classifiers, in addition to evaluating more linear and non-linear combinations of features that generate more complex classifiers. In other words, accuracy can be improved through the use of more and better classifiers, which relies on having greater amounts of "truth" data in combination with the computational capabilities to perform machine learning on a significantly large amount of data.

Figure 5:
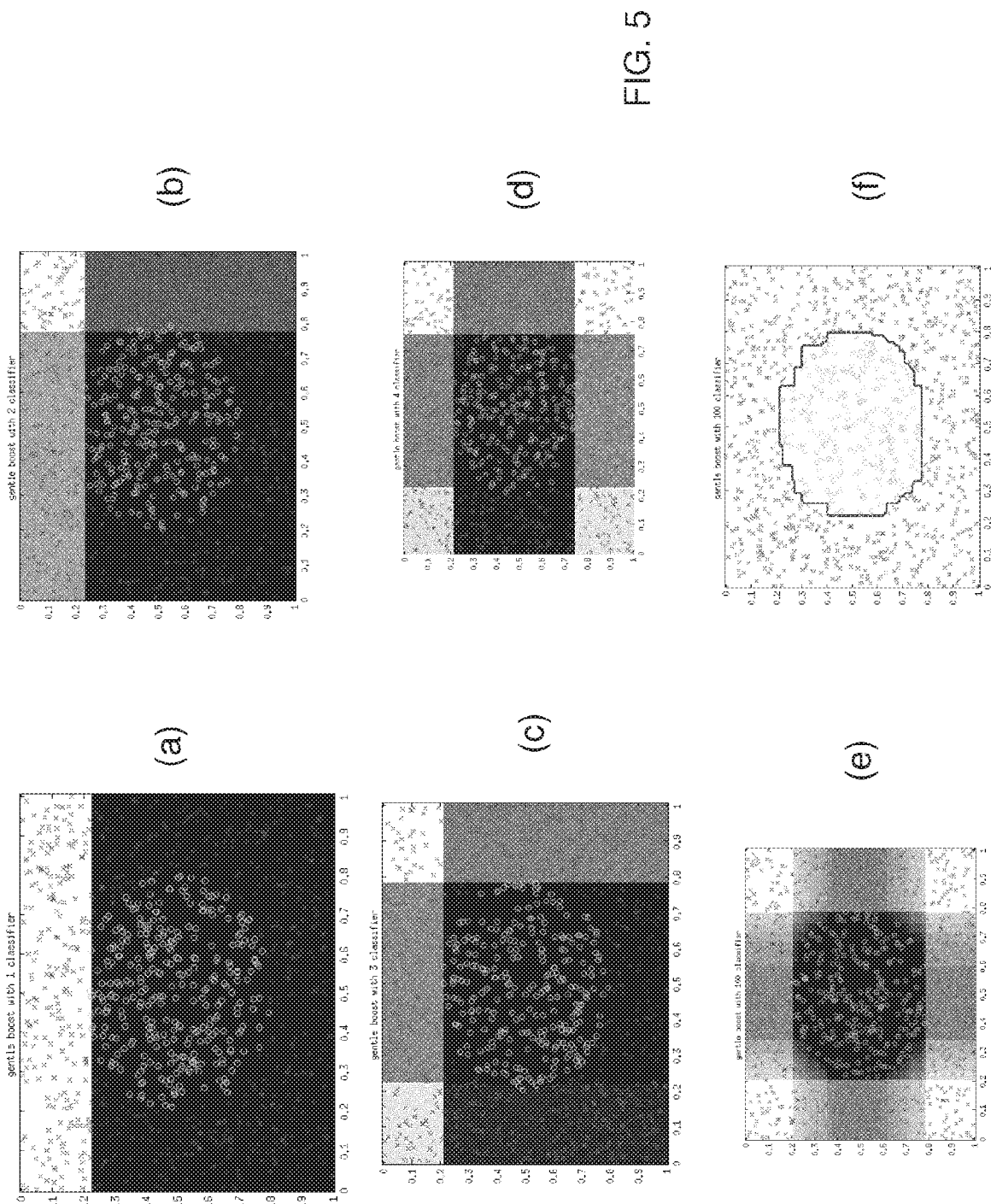
FIGS. 5(a) to 5(f) illustrate a series of classification results.

FIG. 5 illustrates a number of training results using a two-dimensional feature space. In this example, Adaboost training is used, which uses machine learning to estimate the parameters of an ensemble classifier 14. The classifier 14 can be considered a function approximation, where the parameter of the function uses a machine learning algorithm. For example, given a number of positive and negative samples 42, 44, a function $f$ can be found which produces: $f(x\_feature=positive\_sample)=1$; and $f(x\_feature=negative\_sample)=0$, with a minimum possible training error.

Training starts with a single linear discriminant and iterates until sufficient error tolerances are obtained. View (a) in FIG. 5 illustrates a single linear discriminant based on a single feature. View (b) introduces a second linear discriminant based on the next best feature, with view (c) illustrating 3 discriminants, view (d) illustrating 4 discriminants, and views (e) and (f) illustrating the use of 100 discriminants. The classifier is comprised as a set of discriminants, and as can be seen in FIG. 5, the greater the number of discriminants used, the more accurately the classifier can separate the positive and negative samples.

An object classifier design based on Adaboost, for illustrative purposes, can be performed as follows:

Given a set of known output $y_{i=1:n}$, corresponding to sample $s_{i=1:n}$ learning a strong classifier or a set of weak classifiers using a machine is known as machine learning. Let n represent the total number of samples i.e., the sum of positive and negative samples. Feature extraction is an important component of an object classifier design. Finding an optimal feature space that is robust to object rotation translation, perspective and illumination is a challenging task. Usually, principal component analysis is a applied on the feature vectors of a large set of similar objects to estimate a invariant feature space. Boosting, especially adaboost, is another popular optimization frame work to find a set of representative feature vectors and classifiers.

Let $f(s)=T(I, \Omega)$ be the continuous feature space, and in discreet space $f(s_{i=1:n})=T(I_{i=1:n}, \Omega)$ be the extracted feature vector corresponding to sample $s_{i=1:n}$, using a feature extractor method T by applying on a patch $\Omega$ of image $I_{i=1:n}$. Further, the feature vector $f(s_{i=1:n})$ can discretized into j components and expressed as $f_{i=1:d}(s_{i=1:n})$. Where d represents the feature dimension (number of features for a particular sample). An example machine learning approach using adaboost based optimization techniques can be described as follows: $y_i \in \{+1, -1\}$, where $y_i=+1$, if $s_i \in \Omega_p$, and $y_i=-1$, if $s_i \in \Omega_N$.

AdaBoost is a gradient descent based optimization framework for constructing a strong or ensemble classifier that is a linear combination:

$C(f_j t(s_i)) = \Sigma_{t=1}^{T} \alpha_{t=1:n_c} h_{t=1:n_c}(f_j t(s_i))$ of simple weak classifiers $h_{t=1:n_c}(f_j t(s_i))$. Where:

$$h_t(f_j(s_i)) = \begin{cases} 1 & \text{if } f_j(s_i) > \tau \\ 0 & \text{if } f_j(s_i) < \tau \end{cases}$$

is a weak classifier and $H(f_j t(s_i)) = \text{sign}(C(f_j t(s_i)))$ is a strong or ensemble classifier. The algorithm to compute $\alpha_t$ and $h_t$ can be described as follows:

1. Input: $\{f(s_{i=1:n}), y_{i=1:n}\}$
2. Initialize sample weight: $w_0(s_{i=1:n}) = 1/n$
3. For: $t = 0, \ldots, n_c$
   (a) Find the optimal feature dimension $f_j t$, error $e^t$ and $h_t$ by searching over the error space $e_{j=1:d}(s_{i=1:n})$ such that $$h_t = \underset{h_j \in H}{\arg\min}, e_j = \sum_{i=1}^{n} w_t(i)\{y_i \neq h_j(f_j(s_i))\}$$

(b) if $e_t \geq \frac{1}{2}$, then stop, and report these two classes are not separable
   (c) Compute the strength of the weak classifier:

$$\alpha_t = \frac{1}{2}\log\left(\frac{1-e_t}{e_t}\right)$$

(d) Update the sample weights: $W_{t+1}(i) = W_t(i)\exp(-\alpha_t y_i h_t(f_j t(s_i)))$
   (e) Normalize $W_{t+1}(i)$ between 0 and 1 compute overall classification error using:

$E = (n - \Sigma_{i=1}^{n}(H(f(s_i)) \neq y_i))/n * 100$, where:

$H(f(s_i)) = \text{sign}(\Sigma_{c=1}^{t} \alpha_c h_c(f_j c(s_i)))$ (f) if $E \leq 0$, stop.

The feature extractor T can be designed using either a global transformation (frequency domain transformation, i.e. FFT, Gabor filter) or local cell based transformation strategy (Histogram of Oriented Gradient (HOG), Haar like feature). An example symmetric difference of area (analogous to Haar like feature) based feature transformation strategy is described as follows.

Figure 6:
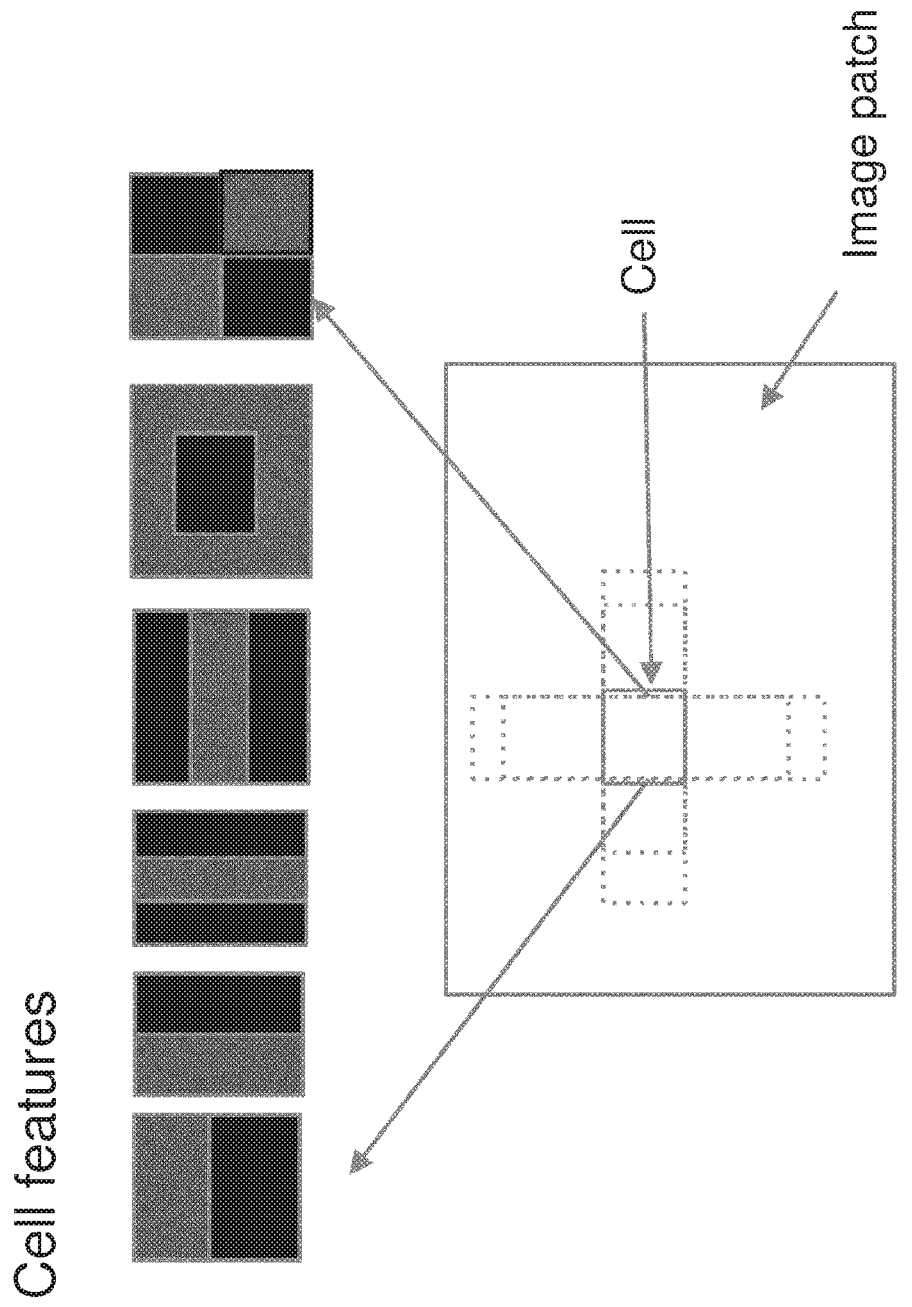
FIG. 6 illustrates a cell within an image patch for an example Haar feature that can be extracted from a video frame.
Figure 7:
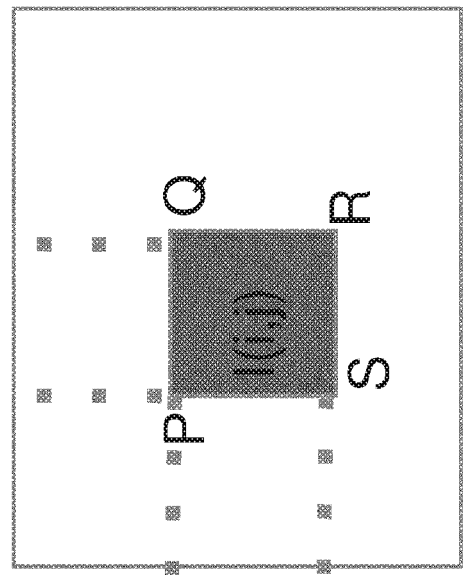
FIG. 7 illustrates a set of coordinates (P, Q, R, S) defining an arbitrary region within a video frame (I)

As shown in FIG. 6, a cell (of various sizes) is constructed around each pixel of an image patch. Then, the difference in normalized intensity weighted area of the regions marked in the different shades shown in the figure, is computed efficiently using an integral image based technique. As shown in FIG. 7, the intensity weighted area of PQRS (shaded region) is defined as $A(P; Q; R; S) = P + R - Q - S$, where:

$P(i_p, j_p) = \Sigma_{i=0}^{j_p} \Sigma_{i=0}^{i_p}(I(i,j))$, $Q(i_q, j_q) = \Sigma_{i=0}^{j_q} \Sigma_{i=0}^{i_q}(I(i,j))$, $R(i_r, j_r) = \Sigma_{i=0}^{j_r} \Sigma_{i=0}^{i_r}(I(i,j))$, and $S(i_s, j_s) = \Sigma_{i=0}^{j_s} \Sigma_{i=0}^{i_s}(I(i,j))$, represent the integral image value at locations $(i_p, j_p)$, $(i_q, j_q)$, $(i_r, j_r)$, and $(i_s, j_s)$ respectively.

By enforcing the geometric area of PQRS $(A(P; Q; R; S))$ to a single unit, the value R can be computed recursively by using the pre-computed value of P; Q and S in linear time as follows: $R = I(i;j) + Q + S - P$, which can be rewritten as:

$$H(i,j) = \begin{cases} I(i,j) + H(i-1,j) + H(i,j-1) - H(i-1,j-1) & \text{if } i,j > 1 \\ I(i,j) & \text{if } i,j = 1 \end{cases},$$

where H represents the integral image. Given the integral image, the higher order statistic of any cell can be computed efficiently in constant time. The estimation of first (mean) and second (variance) order statistics are described as follows:

$$\mu(P, Q, R, S) = \frac{A(P, Q, R, S)}{n} \text{ and}$$

$$V(P, Q, R, S) =$$

$$\frac{1}{n} * \left(A(P^2, Q^2, R^2, S^2) - \frac{\mu(P, Q, R, S) * \mu(P, Q, R, S)}{n}\right),$$

where n is the number of pixels inside A and $P^2(i_p, j_p) = \Sigma_{i=0}^{j_p} \Sigma_{i=0}^{j_p}(I(i,j)*I(i,j))$, is the integral image of squared intensity at location $(i_p, j_p)$. It may be noted that $Q^2$, $R^2$, and $S^2$ can be described similarly.

Figure 8:
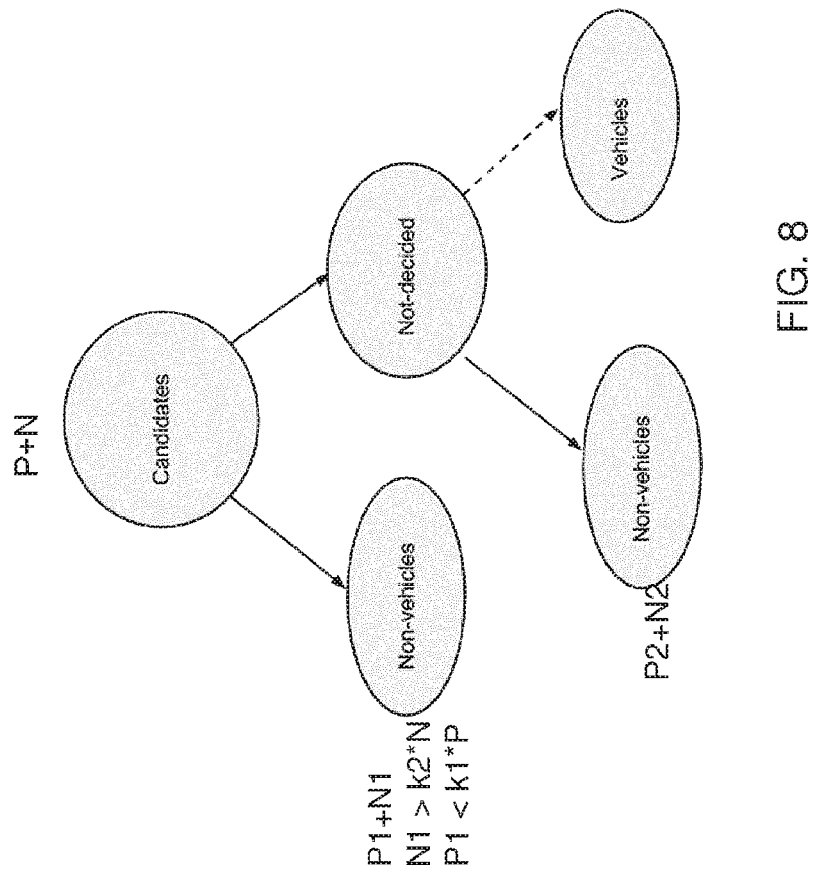
FIG. 8 illustrates hierarchical binary discriminants.

FIG. 8 illustrates hierarchical binary linear discriminants and how several weak discriminants can be combined to separate two classes, for example vehicles from non-vehicles. Adaboost parameter estimation can be used to construct a set of hierarchical binary linear discriminants for this purpose. The Adaboost, or other algorithms, can be implemented on learning infrastructure and executed over large numbers of data samples in parallel.

It has been found that to increase the sample space that is searched and analyzed can create a computational bottleneck. For example, for an image patch of size 32×32, the approximate number of features is nd=32×32×32×32~0.67M. The number of sample is ~1M positive×100M negative samples and the input vector size=100M×67 M×8~536 TB of data. To address this bottleneck, a cascading approach is used where a selective united set of weak classifiers are compared against arrays of weak classifiers. At each stage, some of the samples are classified as true negatives.

Figure 9:
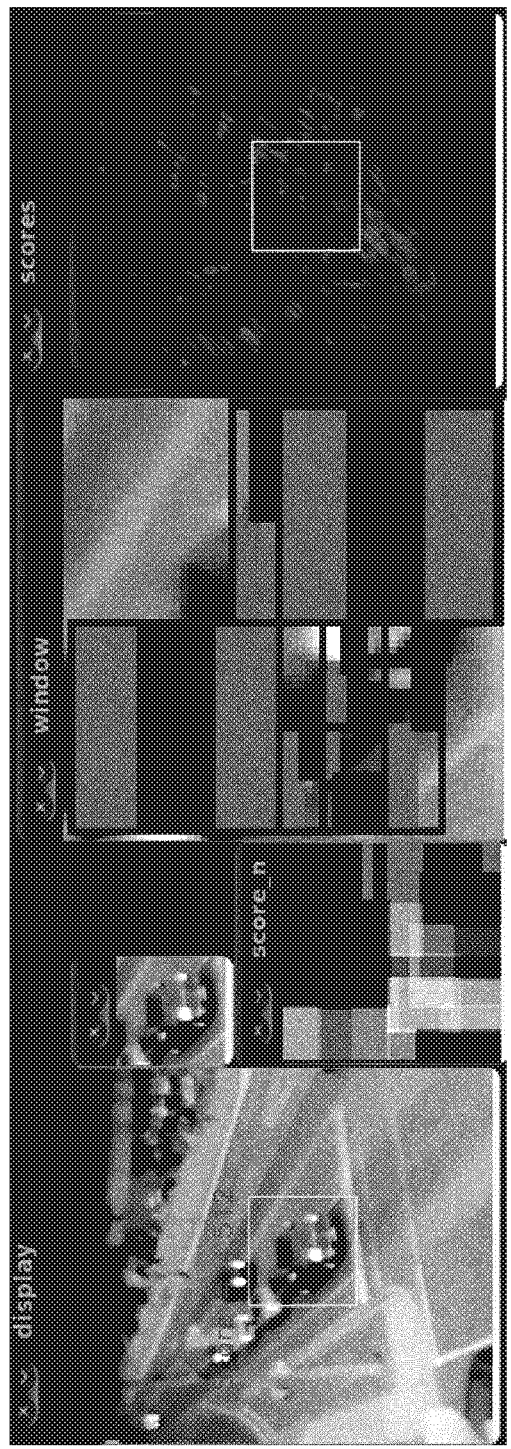
FIG. 9 illustrates how a classifier determines if an object of interest is located within a context.

FIG. 9 illustrates how a classifier determines if an object of interest is located within a context. For this case, measurements are extracted from an image frame extracted from a traffic intersection video. The sliding window (box in leftmost image) is centered at each pixel within the frame and the pixel intensities are extracted (top 2nd column). Haar features, specified in (3rd column), are then extracted from the measurements to produce a feature vector used as an input into the classifier. The classifier, using the parameters obtained from the learning system for these features, then produces a detector score. If the detector score is positive, the region is classified as a vehicle, and if the detector score is negative, the region is classified as a non-vehicle. For visualization purposes, each detector score is then stored as a single pixel (column 4) for each corresponding pixel from the original image (column 1). The scores (column 4) show the detection hit for every pixel in the original image; red regions correlate to the position of vehicles and blue regions correlate to the non-vehicle regions.

Figure 10:
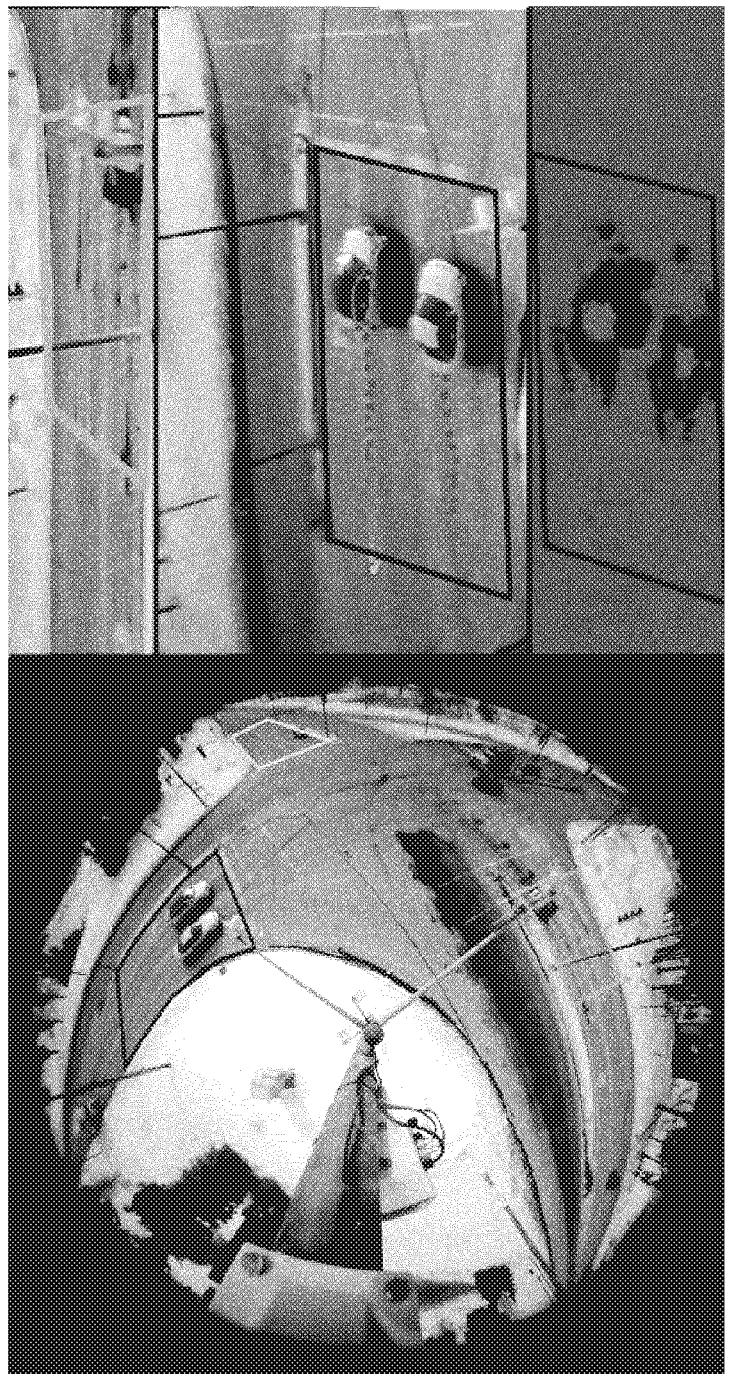
FIG. 10 illustrates an example of pre-processing in which a spherical image captured from a VIVDS is rectified using a non-linear transformation.

As discussed above, the learning platform 12 receives data that has been pre-processing for training and learning, in the learning pre-processing stage 26. FIG. 10 illustrates an example of such pre-processing in which a spherical image captured from a VIVDS is rectified using a non-linear transformation. The rectification ensure incoming traffic has a homogenized flow from left to right and vehicles have a constant height for better event recognition. The event detector (middle-right image) tracks two vehicles in this example, the first travelling through an intersection and the second turning right, using a detection/classification map (bottom-right image) where blobs=cars and surrounding shade=road.

Figure 11:
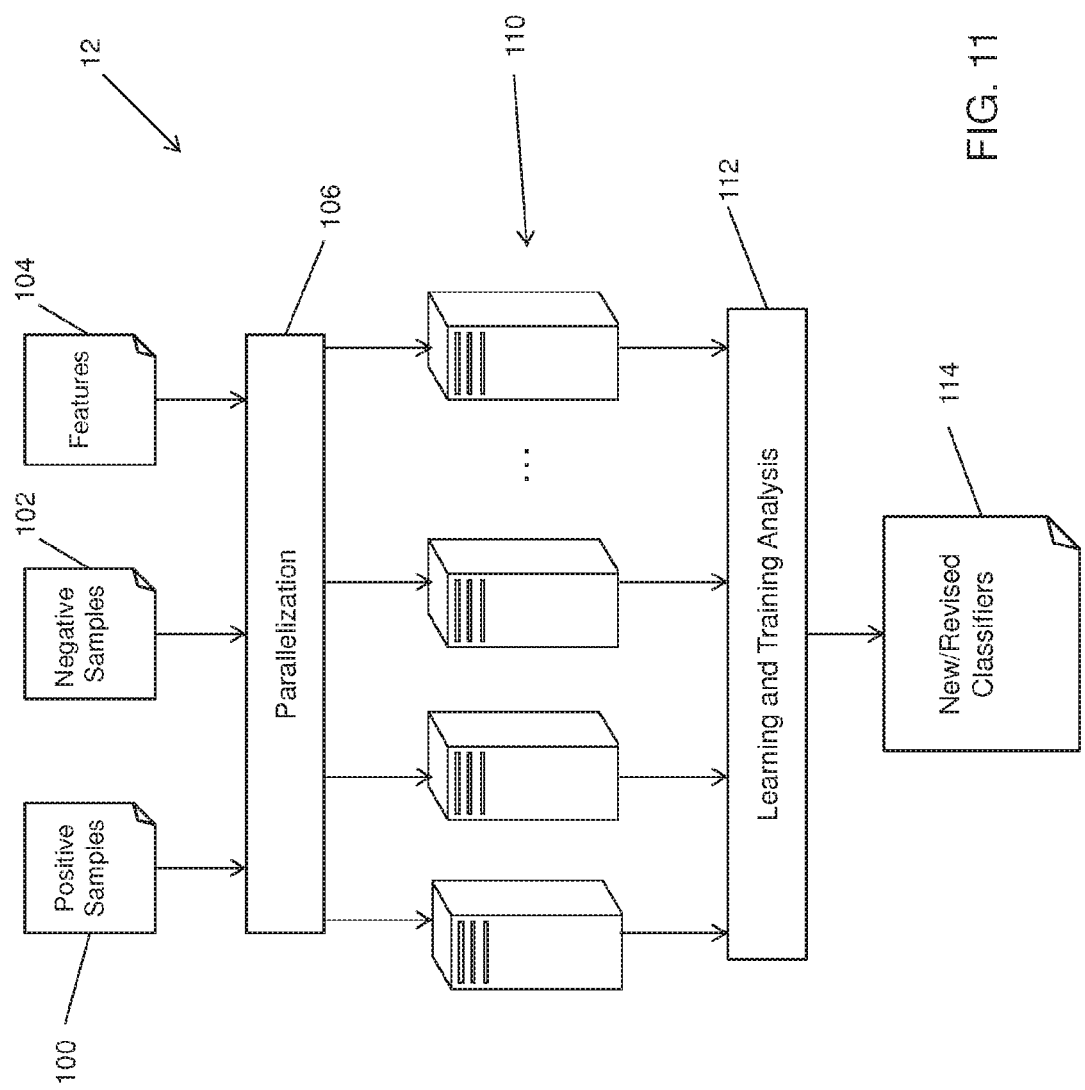
FIG. 11 is a schematic diagram illustrating an example of a distributed computing configuration.

To leverage the large scale data in the database 16, the learning platform 12 utilizes a distributed computing configuration as illustrated in FIG. 11. As shown in FIG. 11, the learning platform 12 operates on a set of positive samples 100, a set of negative samples 102, and a set of features 104 to be trained to determine new/revised classifiers parameters 114. As discussed in greater detail below, the samples 100, 102, and features 104 create a large search space that would create a computational bottleneck if processed serially and is considered not to be feasibly processed with a finite amount of memory on a single system. A parallelization stage 106 is performed in order to divide the search space into manageable tasks for a distributed collection of computing resources 110 to each evaluate a portion of the parameter estimation algorithm given a subset of the sample size. It can be appreciated that the parallelization stage 106 can employ any suitable type of parallelization, such as GPU parallelization with CUDA or openCL, database Hadoop, elastic map reduction approaches, etc. Any such parallelization approach that is employed, would be chosen and/or adapted to the particular algorithm architecture. In one example, given a threshold, a feature dimension, and a set of samples, one computing resource could calculate the aggregate score indicating how well a feature separates the data. From the distributed processing, a learning and training analysis stage 112 is performed using the results of each partially computed algorithm in aggregation to iteratively improve the classifier. For example, the aggregate results could be used to determine the best feature to distinguish two categories, then that feature could be suppressed to find the next best feature, and the process can continue iteratively until acceptable at least one termination criterion is achieved. While creating a classifier from boosting linear discriminants is understood, this process can be extended to non-linear functions by evaluating n-dimensional combinations of features. For instance, given features l0, l1, l2, . . . , a quadratic search space can be defined by including additional features q01, q02, q03, q12, q13, . . . , and defining, for one example, q01=l0*l1 or qij=li*lj. There are any number of feature combinations that can be explored allowing any arbitrary shape to be tested.

Other non-boosting algorithms can also be trained through the use of multiple computing resources to evaluate a subset of a learning algorithm. For example, non-parametric learning may classify a data point by selecting the nearest memorized sample data in the feature space. For this case, the memorized sample data can be generated by pruning the sample data to only those near the boundaries, thereby classifying any point on one side of a boundary as one category. Given all of the data points and all of the data samples, the pruning process can be distributed over multiple-computing resources. One method of distributing the pruning task may be to distribute the feature space and distribute the sample space and have each computing resource construct boundaries using the given subsets; then any two computing resources can aggregate their data together to form boundaries that comprise of the most representative data samples and features. The process can continue to aggregate until all of the data samples and all of the features have been aggregated into a collection of representative boundaries, consisting of a subset of memorized data samples and features.

For a random forest algorithm, several boosted discriminants are combined into a graph structure for a Monte Carlo based classification. The learning procedure using the proposed distributed learning platform 12 would include the graph structure as part of the parallelization process. For a convolutional neural network (CNN), the distributed learning platform can be used to select the most relevant data samples from a very large pool of data to reduce CNN training computation costs. For hierarchical combinations of learning algorithms, the distributed learning system can improve training time by parallelizing the learning process for each algorithm. Also, given a set of support vector machines (SVM)s, the distributed platform 12 can run multiple SVM candidates in parallel, while taking advantage of human feedback and data sample size reduction, and find the SVM candidate that "best" classifies the data samples, where "best" might be computational performance and/or fewest features.

Figure 12:
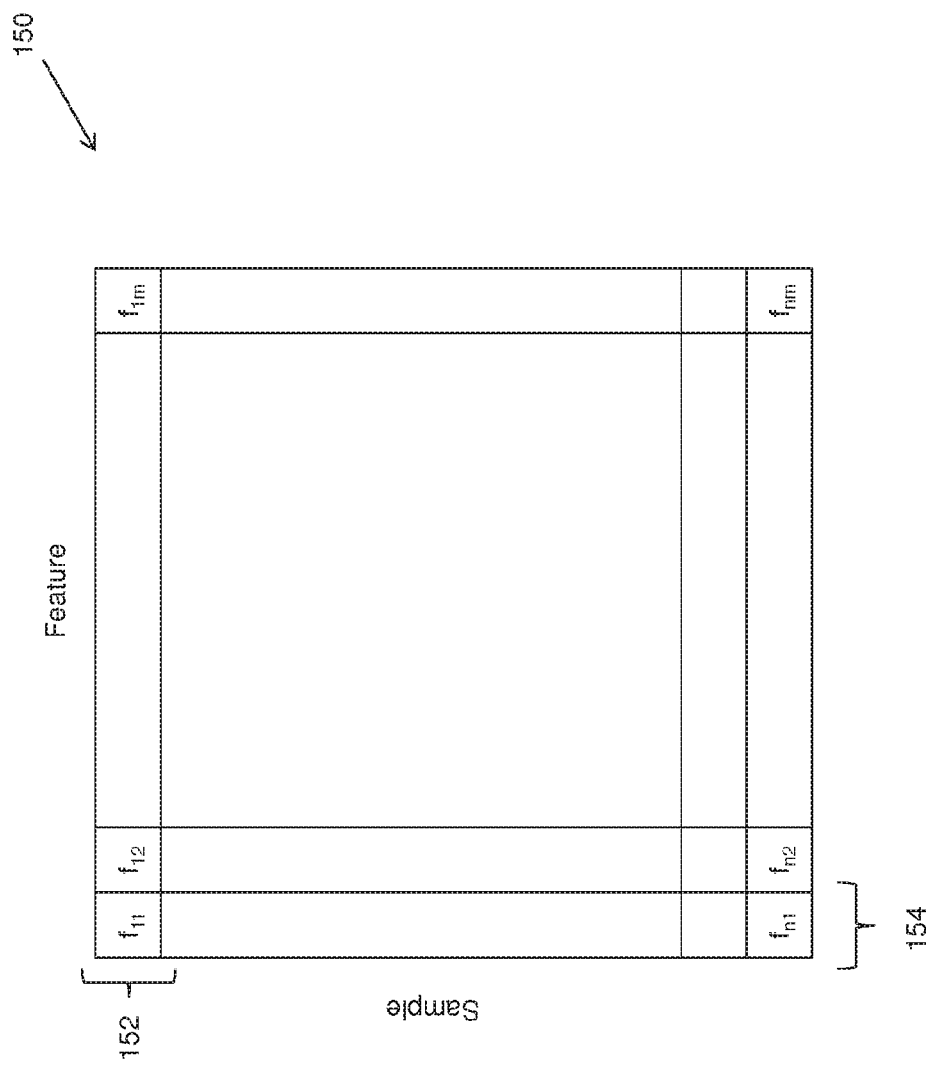
FIG. 12 illustrates an example of a feature set to be parallel processed.
Figure 13:
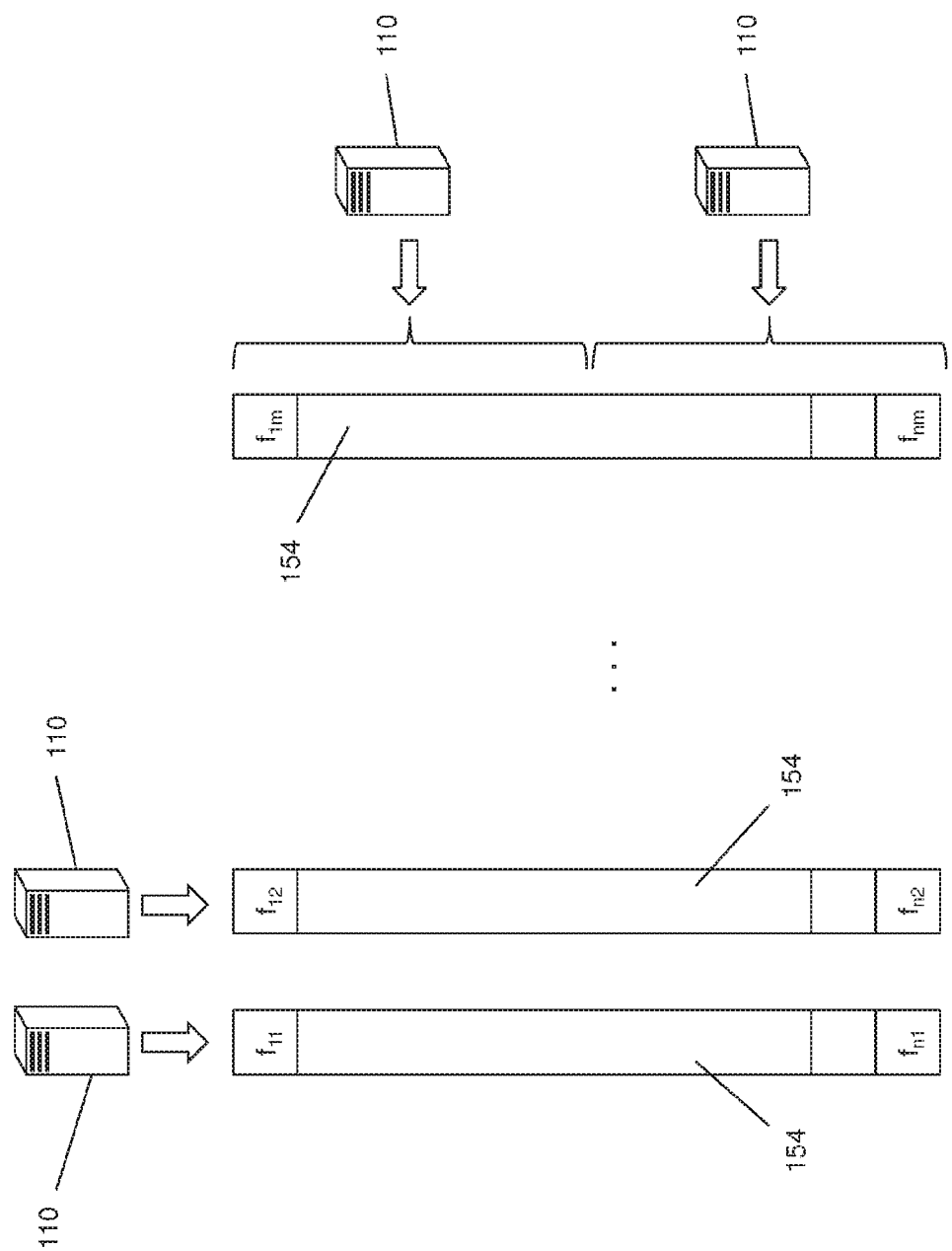
FIG. 13 is a schematic diagram illustrating an example of distributed parallel processing.

FIG. 12 illustrates an example of a search space 150 in which each row 152 evaluates a particular sample against all of the features being evaluated, and each column evaluates a particular feature against all of the samples. The larger the feature set and larger the sample set, the greater the potential to improve classifier accuracy and classifier generalization. The set of features can be derived using a bank of non-symmetric kernels, where the number of kernels can be an exhaustive set of all possible offsets and scales. FIG. 13 illustrates how the search space 150 can be divided amongst a number of computing resources 110 to each evaluate a particular feature against the samples. As also shown in FIG. 13, a column 154 can itself be divided amongst a plurality of computing resources 110, e.g., if the number of samples is quite large. In general, any subset of the features and samples can be distributed over an arbitrary number of computing resources allowing computations to be performed over a distributed block of memory that can be too large to be stored in a single machine. Then the operations can be performed by the computing resource containing the subset of memory or by other computing resources with access to the computing resource containing the subset of memory. The memory storage can be distributed over any number of computing resources, as can the computation tasks performed on the memory. The learning algorithms can then be divided among the computing resources to minimize aggregation overhead and computing time given individual computing resource processing power and memory storage capacity.

FIG. 14 illustrates computer executable operations that are performed in conducting a training and learning process to a large scale dataset according to the configuration shown in FIG. 1(*a*). At 200 the learning platform 12 obtains the validated data, e.g., from the validation stage 24 and/or from the database 16 and applies the learning pre-processing stage 26 at 202. Based on the validations performed, the learning platform 12 determines the positive samples, negative samples, and features that are to be analyzed at 204, and creates a plurality of parallel computing jobs or tasks to be performed in a distributed manner at 206, using a distributed computing environment (i.e. by accessing available computing resources). The results are aggregated by the learning platform 12 at 208 as discussed above, and the aggregated results are analyzed at 210 to determine new and/or refined classifiers 14 to be subsequently used by the system 10. This process may repeat iteratively as new validated data becomes available.

FIG. 15 illustrates computer executable operations that are performed by the learning platform 12 according to the configuration shown in FIG. 1(*b*). At 230 the learning platform identifies unrepresented sample space, e.g., by identifying edge cases where the classifier created by the learning platform 12 does not generalize sufficiently to separate classes. The new data samples are determined for the unrepresented sample space at 232 and these new data samples are added to the database 16 at 234. There are various ways to determine edge cases depending on the application and classification algorithm implementation. One method is to use an independent observer to classify objects independently from the trained classifier, or to use two trained classifiers with independent implementation and algorithms. The observer can generate validation data which can be compared against the output from the trained classifier. Then, edge cases can exist where the output of the two classifiers differ. For these cases, the sample data can be extracted, properly labelled, and introduced into the learning platform for retraining.

The following provides an example of a method and system for remotely analyzing multimedia content, in particular video content, and extracting information from such multimedia content, which can be leveraged by the learning platform 12 to generate more accurate classifiers 14. This example system analyses, e.g. a video file, FTP, file upload or streaming data, and parameter settings provided by a client (e.g. web-based, Linux, Windows, Unix, Solaris, Mac etc.). The system may also utilize a computer accessible network (e.g. Internet, TCP/IP protocol, UDP protocol etc.), and one or more remote server entities having data storage and data processing capabilities.

The client can send video content and parameters associated with the video content over the network to a storage node at the server side and configuration and analysis of the video content may then be performed thus offloading processing intensive operations from the client side to the server side. Information pertaining to the analysis is typically stored in a data storage module and can be accessed by the client via the network. The client can either include a user interface for uploading the content, or can comprise a module for streaming content automatically.

The server can also analyze the video content from multiple clients simultaneously and can store the video content in data storage in a sequence that can be subsequently analyzed.

The system moves the analytical processing and configuration of the content away from the multimedia device that obtains the content and onto one or more remote server entities or devices that work together to configure the multimedia content, analyze the content, refine the results and report back to the client device. This avoids the need for specialized and/or dedicated devices and software required to perform the analyses and can eliminate/offload labour intensive analysis steps from the client side. As will be discussed in greater detail below, the content can be either captured and uploaded or streamed directly to a centralized location. This offers an inexpensive, scalable and more flexible solution since the user can link into the system whenever required rather than having such dedicated equipment.

Figure 16:
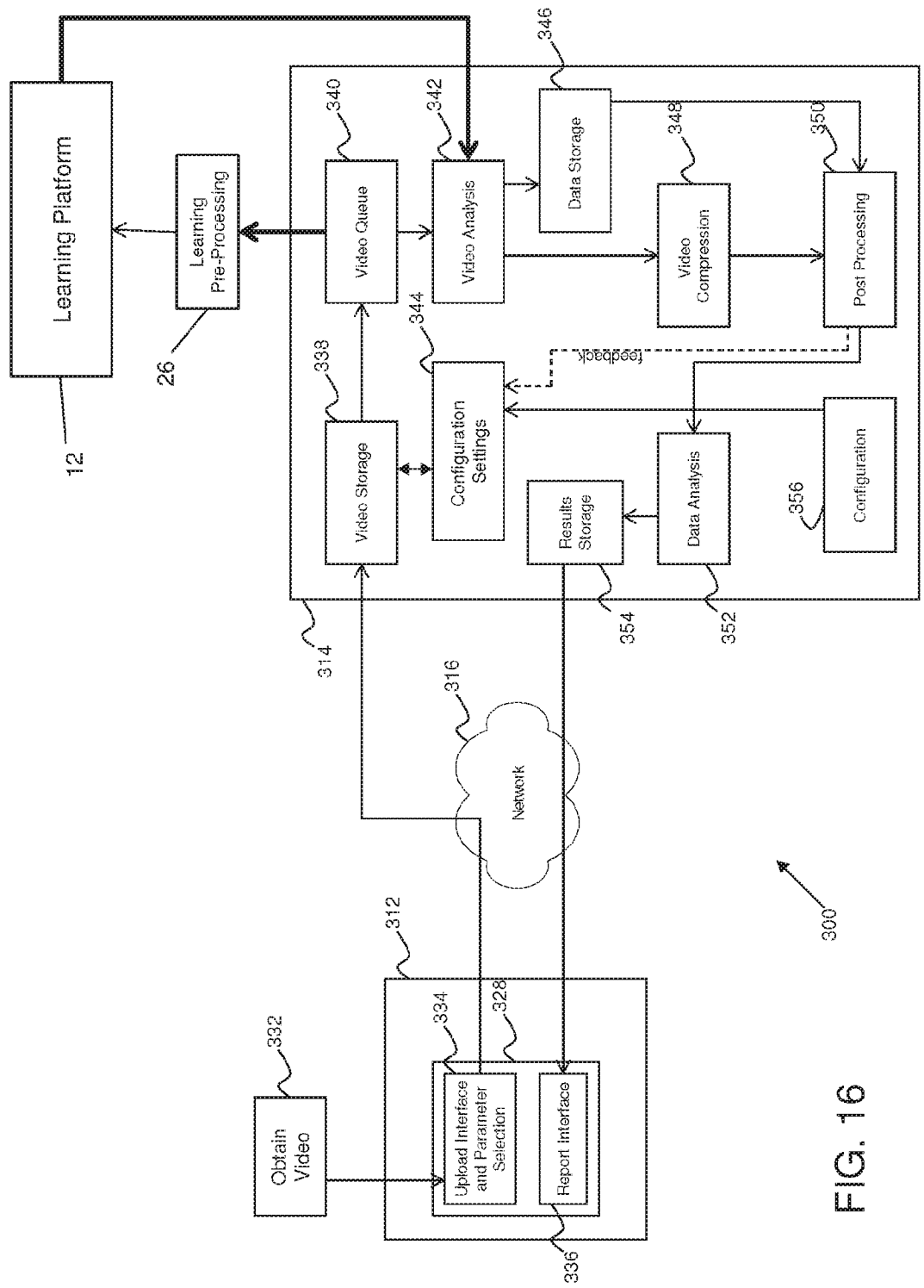
FIGS. 16 to 18 are schematic diagrams of an example of a VIVDS utilized by a learning platform.

FIG. 16 provides an overview of the data flow from the client side to the server side. Although the following examples are provided in the context of video content and video analysis, it will be appreciated that the principles equally apply to other multimedia content and multimedia analysis as discussed above.

In stage 332, video content, e.g. a video file, or any signal content is obtained by an imaging device (video camera, thermal, etc.), a non-imaging device (accelerometer data, radar, transponder data, etc.), or a combination thereof. This can be effected by loading a file into PC 328, downloading a file from storage etc. In the example shown in FIG. 16, a user upload interface 334 is provided by the PC 328. The upload interface 334 is typically a graphical user application providing a portal for the user to communicate, as the client 312, with the server device 314. In this embodiment, it has been recognized that compression of the video file may not be required to perform the upload and in some circumstances can adversely burden the client 312 by requiring additional processing power and capabilities. As such, in order to further offload processing tasks from the client 312 to the server 314, the frame rate, bit rate and resolution of the video content that is being sent is adjusted to balance the competing objectives of file "size" and "upload speed". It has been found that in most applications, the additional time required to send an uncompressed video file when compared to a compressed version of that video file does not render the process slow enough to necessitate compression techniques in order to satisfy the client 312. It will be appreciated that if the client 312 desires, or if the application warrants video compression, a video compression stage may be incorporated into the procedure on the client side 312. As will be explained below, video compression may be desirable when streaming video, in particular because the processing at the client side for such compression would be done automatically at a permanent or semi-permanent streaming module.

The upload interface 334 also preferably provides for parameter selection to enable the user to define specific video analysis parameters, e.g. vehicle movements, shopper behaviour, constraints, time periods etc. The parameters can be used by the server 314 for custom analyses and to provide better/specific computer vision where appropriate. The parameters are sent over a network 316 to the server 314 as a set of parameters with the video file. The client 312 may also have access to a report interface 336, which enables the user to obtain, view, print, store, send etc., any information pertaining to data extracted from the video file that is made available by the server 314. It has been found that the parameter selection is preferably minimized so as to not overly burden the client 12 with additional processing tasks. As will be explained in greater detail below, it has been recognized that configuration of the video analysis 342 for a particular video file can be more efficiently performed at the server side 314. In this way, the user at the client 312 is not required to generate configuration settings 344 for each and every video for the video analysis 342 aside from routine parameter selection and the initiation of an upload to the server 314. The server 314 thus offloads even more processing from the client 312 offering a better and more efficient service to the client 312. This centralized approach to generating configuration settings 344 also allows greater consistency in the end result of the analysis and does not rely on the skill or attention of the user at the client side to perform the necessary steps. Also, since different users may act on behalf of the client 312 at any given time, the configuration shown in FIG. 16 does not have to rely on restricted users or significant user training at the client 312.

At the server side, the uploaded video file and the associated parameters selected by the user are received and stored in a video storage 338. The video file may be stored amongst many other video files which may originate from the same client 312 and/or various other clients 312 (not shown). Since many video files 324 may be stored for processing at the server 314, a video queue 340 may be established to prioritize and schedule the delivery of selected video files 324 to the video analysis stage 342. While the video files are stored and waiting to be analyzed, the video file is examined and configuration settings 344 generated and stored at the server 314. The configuration settings 344 are determined and modified in a configuration stage 356, which may be performed remotely by a different entity.

The video storage 338 and video queue 340 stages are shown separately only for ease of explanation. It will be appreciated that the video content may be uploaded directly into the video queue 340, i.e. not stored in the traditional sense. Also, the video queue 340 may instead be a scheduling task run by the video storage 338 in order to prioritize the analysis process. As shown, the video stream may be stored locally at the server 314 in the video storage 338, and then be added to the queue 340 when appropriate. The video queue 340 can prioritize video analyses based on time of arrival, a service level (if a paid service is used) or in any other order as defined by the administrator of the server devices 314. Moreover, as noted above, the queue 340 enables the server 314 to handle multiple video streams incoming from multiple clients 312 such that priorities can be optimized. The video upload and the necessary parameters (once stored) are fed to a video analysis module 342.

As illustrated in FIG. 16, in this example, data can be obtained from the video queue 340 by the learning platform 12 and undergo the learning pre-processing stage 26 for training and learning purposes. The results of the learning platform's analyses can be fed back to the video analysis stage 342 to improve the parameters used to conduct the analyses.

The video analysis module 342 applies either custom computer vision algorithm(s) defined by the configuration settings 344 as defined in the configuration stage 356, or may apply one or more pre-stored, pre-defined algorithms. It can be appreciated that the same pre-stored, pre-defined configuration settings 344 can also be applied to multiple video files. This may be useful where different video files relate to a similar "scene" or "study" and thus capture similar behaviour that can be analyzed in a consistent manner. This allows a client 312 to define parameters and have the configuration stage 356 performed only once and the outcome of this applied to each and every video file that is uploaded. The nature of the methods and the operation of the video analysis module 342 may vary based on the type of content being analyzed and the user-specified parameters. For subscription-type services, the server 314 may then store customer-specific profiles that can be loaded when that customer's content is next in the queue 340. This enables the server 314 to act as a remote service for many clients 312 thereby providing capabilities that may otherwise be too expensive for many individual clients 312 to implement.

The extracted data generated by the video analysis module 342 is stored in a data storage module 346 and the video file that has been analyzed may be compressed at a video compression stage 348 when performing automatic or partially automatic post processing, so that it may be efficiently transferred to a post processing stage 350 along with the extracted data stored in the data storage module 346. It will be appreciated that the video compression stage 348 and data storage module 346 need not be separate and distinct stages, namely the resultant data and a copy of the video file may be transferred directly from the video analysis stage 342 to the post processing stage 350. However, as will be explained below, the data storage module 346 and video compression stage 348 may be implemented by an entity that is different than that which performs the video analysis 342, and in which case these stages would be needed to enable the transfer between separate entities. It will be appreciated that the stages shown on the server side are shown as being performed collectively within a single server entity 314 only to illustrate generally those stages that are preferably offloaded from the client 312. Embodiments will be described below wherein the server 314 is comprised of more than one server entity or device and thus the server 314 may be considered one or more server entities or devices that are responsible for the processes shown on the server side 314.

In a traffic analysis embodiment, the resultant data is in the form of one or more tracks. Typically, all tracks in the video content are extracted, regardless of the object that has created them or what information is actually relevant in terms of reporting results. The track data can be stored in the data storage module 346 in the form of position, time and object vector points. At a later time, the track data can be "mined" based on certain criteria. For example, in such a traffic application, vehicle movement (e.g. how many turn left) or vehicle speed (e.g. how fast are the trucks going) may be of interest. To ascertain this information, all tracks from the video content can be imported that were extracted in the first layer of signal processing (i.e. the tracking) and then a second layer of signal processing can be conducted to "ask" questions of the track data to extract such information of interest. In this example, if cars are of interest, trucks and people can be filtered out etc. The tracks can thus be extracted and stored for later analysis, whereby it can then be determined where the desired information is. In this way, result data can be obtained either in real time or at a later time. It will be appreciated that tracks are only one form of resultant data produced by the video analysis stage 342.

Since the video analysis 342 may not be perfect and for some algorithms and/or types of video content, the results may not be reliable enough to ensure consistency. To mitigate such unreliability and to offer an improved quality of service, the post processing stage 350 (e.g., a validation stage 24) is included at the server side. The post processing stage 350 may conceptually be considered a quality assurance (QA) stage that is performed in order to review the extracted data so as to verify the integrity of the extracted data with respect to what actually occurred in the video file, correct any errors that are found and, in general, ensure that the analysis is satisfactory. The post processing stage 350 allows the server side to separate duties amongst several server devices. The post processing stage 350 is typically performed in an automatic or partially automatic fashion but may also be performed manually by a human operator. In one embodiment, as video files are processed in the post processing stage 350, a determination is made based on known or pre-stored information about the video, e.g. based on previous videos, as to which one of the processing streams to use, namely automatic or partially automatic. In the fully automatic and partially automatic processing streams, little or no QA is required. In some applications, manual processing involving manually tracking, identifying and classifying objects may also be an optional processing stream. In a fully automated stream, no post-processing would be needed, i.e. nothing to "correct". The choice of which stream to use may vary based on the nature of the video content. Typically, a computing device may be used to evaluate all or portions of the video content to determine if any further processing is required. In some embodiments, a human operator may instead or also be used to determine which level or stream should be used. In other embodiments, the characteristics of the video content may be used to assist a human operator's decision. The post processing stage 350 in general may flag areas in the video file, to the operator, where the computer vision or video analytics techniques failed, or where there is reduced or lack of confidence in the results. For example, a level of confidence can be assigned to each object, indicating how probable it is that the object is actually an object of interest such as a vehicle in a traffic video. A level of confidence may also be assigned as to how confident the video analysis stage 340 is at estimating the movement of the object, e.g. left turn, right turn, through intersection, etc. The post processing 350 can utilize a tool to jump to tracks in the video with a confidence level below a certain threshold, e.g. 70%, so that the operator only needs to examine those results that are not within a range of confidence.

The post processing 350 may result in a modification of the extracted data and may determine modifications to the configuration settings 344 to improve further video analyses for that client 312 or category of video content. If so, configuration feedback can be provided to the configuration settings 344. The data, whether it has been modified during post processing 350 or not, is analyzed at a data analysis stage 352 to generate information that extracts meaning from the data for the purpose of making understandable information regarding the analysis available to the client 312. The analyzed results are then stored in the form of report data in a report storage 354 and returned to, accessed by, or downloaded by the client 312 through the report interface 336.

Figure 17:
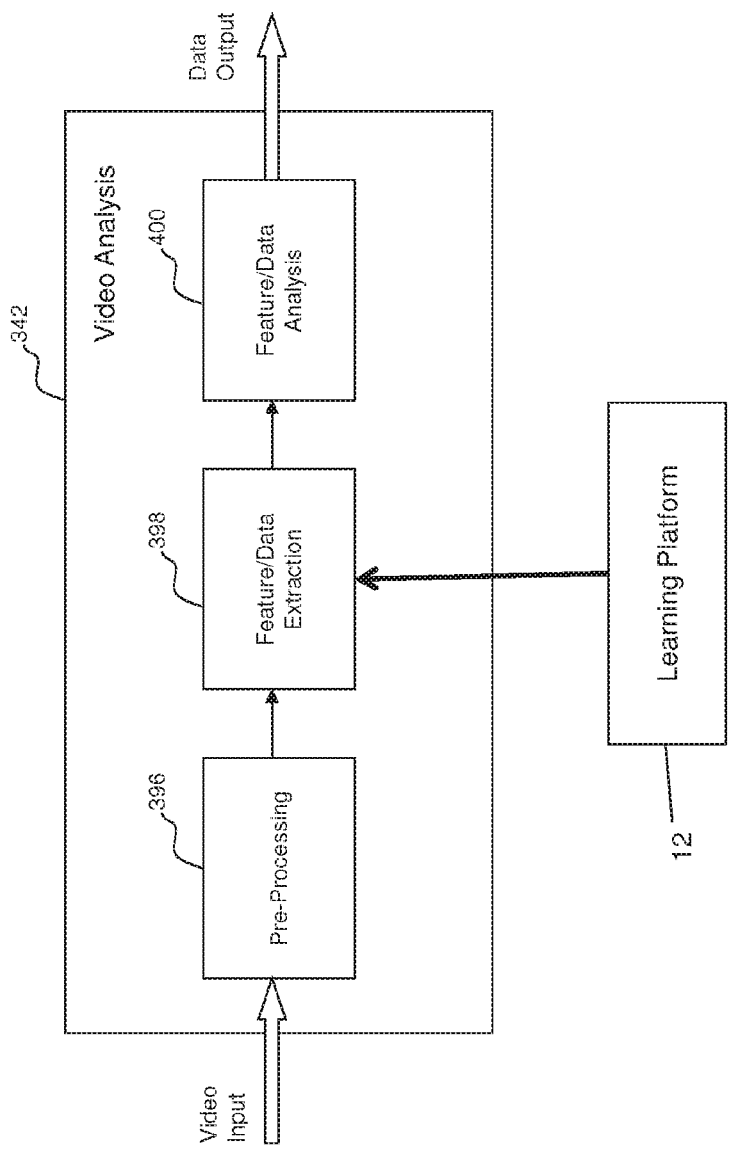

Turning now to FIG. 17, the video analysis stage 342 is shown in greater detail. In general, the video analysis stage 342 receives video content as an input, processes the video content according to various modules and outputs data representative of the analysis of the video content. Conceptually, the video analysis stage 342 utilizes a framework described as a graph having algorithm or process modules as nodes and interfaces as edges. In one embodiment, each module (node) in the graph accepts input in the form of one or more of the following: video frames, frame masks, tracks, objects, messages. Each module also outputs one or more of these data types and executes a specific algorithm. The algorithm may be computer vision or any general information processing task. Typically, the input to the analytics framework graph would be video content (e.g. file or stream) comprising digitized frames and the output data would be data relating to the video content.

The above framework has been found to be particularly suitable for being executed on a DCS platform since each module can be executed on a distinct computing/processing node such as a distinct CPU. Also, by using well defined interfaces between the modules, the framework has been found to be particularly robust and easy to develop on and scale. In this way, the framework can be customized to suit particular customer needs without requiring an intimate knowledge of the inner workings of each module, only the inputs and outputs. FIG. 17 illustrates three general sub-stages in the video analysis stage 342 that each may include one or more individual modules and accompanying edges or interfaces. Also, each sub-stage may be implemented on one or more distinct computing nodes, e.g. in a DCS. The three sub-stages shown in FIG. 17 are a pre-processing stage 396, a feature/data extraction stage 398 and a feature/data analysis stage 400.

In the embodiments that will be described below, the pre-processing stage 396 comprises the steps taken to prepare the video content for the analysis procedure. For example, the video content may be modified to correct for environmental factors and registered to correct for movement of the camera. The pre-processing stage 396 enables the feature/data extraction stage 398 to more accurately identify objects and events in the video content and do so consistently from frame to frame and from segment to segment. Stage 396 in general looks for any characteristic of interest to the client 312 for the purpose of extracting information about the video content. The feature/data analysis stage 400 typically compares the extracted features and data to predetermined criteria or expected results to generate the output data. This may include classifying objects found in the video in a certain way for counting or event detection etc. It will be appreciated that the general steps 396-400 shown in FIG. 17 are meant for illustrative purposes only and that more or fewer stages may be used depending on the application and complexity of the video content and the complexity of the computer vision techniques used.

Figure 18:
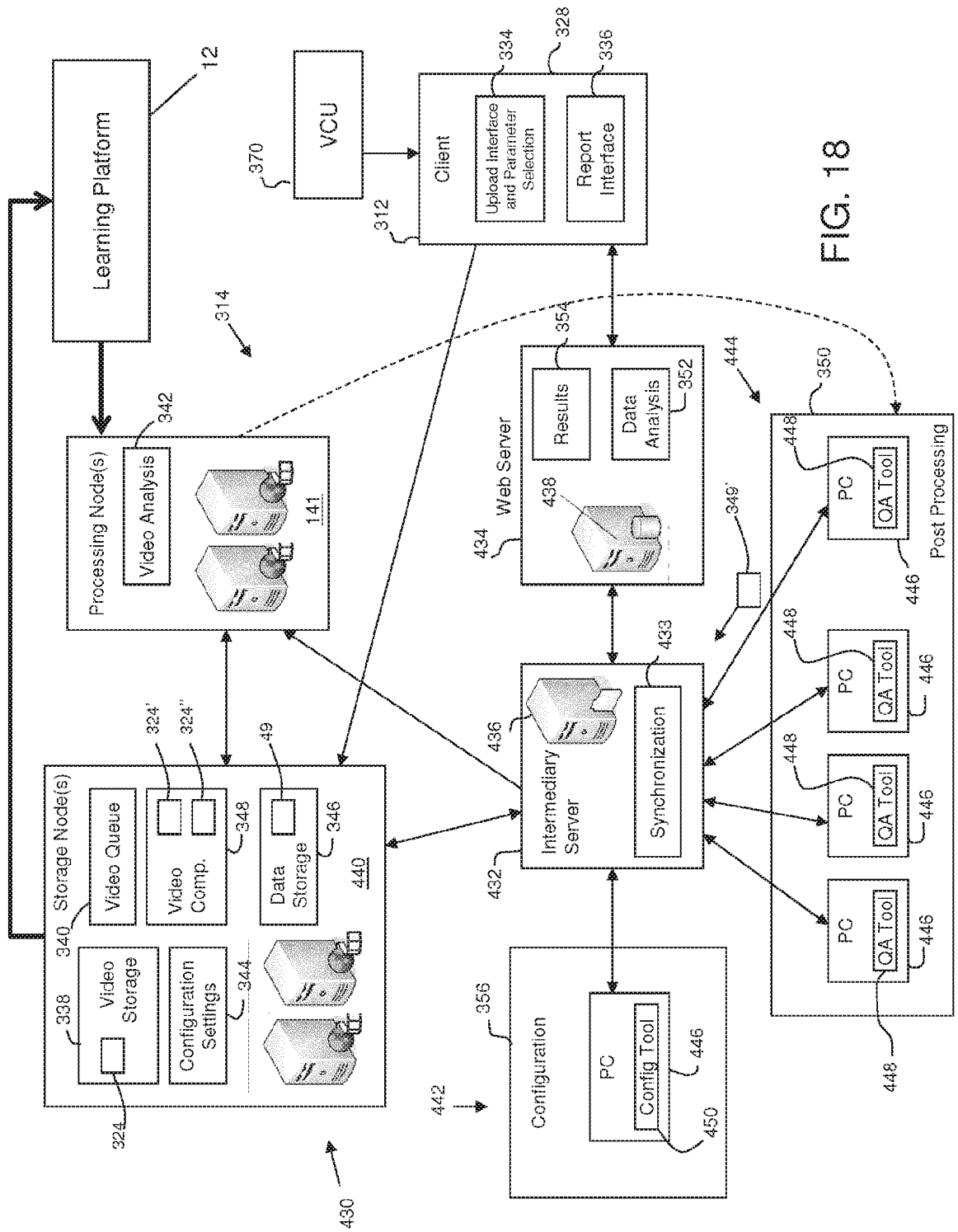

As discussed above, the role of the server 314 shown in FIG. 16 may be divided, distributed and optimized by utilizing more than one entity or server device. FIG. 18 illustrates one example wherein the server 314 is comprised of several interrelated entities that each perform one or more tasks in the overall processing of the video content. As can be seen in FIG. 18, the client 312 collects video in this example using a video collection unit (VCU) 370 and includes or otherwise has access to the upload interface and parameter selection module 334 and the report interface 336. The client 312 initiates the video analysis process by accessing a web server 434. It will be appreciated that the web server 434 may be accessed through the network 316 shown in FIG. 16 or may be accessed through another network. Preferably, the web server 434 is a publicly available website on the Internet but may also, in some applications, be part of a private network, enterprise network, local network, etc. It will also be appreciated that each entity shown in FIG. 18 may be geographically separated or within the same location depending on the application and availability of resources in different locations.

The web server 434 in this example provides a front end interface or "portal" for the client 312. The web server 434 allows the client 312 to initiate a video upload process and to obtain information related to the results of the analysis, generate or access reports, manage billing and account services and perform other administrative tasks as necessary. The web server 434 may also be used to enable the client 312 to perform parameter selection and in other embodiments perform some configuration tasks in generating the configuration settings 344.

In the context of traffic video files, many studies run for extended periods of time such as 6 hours. To better manage the upload process, the video file may be stored in fixed-length chunks, e.g. 6-1 hour videos. This avoids the user having to re-upload already completed chunks if the uploading of a later chunk fails during the upload process. This may also be done to further parallelize the analysis. For example, instead of using one computing device to process 10 hours of video content, the video content can be split into 10, 1 hour chunks that can be processed each hour using a separate device. The use of a DCS 430 enables the client 314 to massively parallel process the video content so that complex computer vision techniques can still be used in a reasonable amount of time. The separation of the video file into separate chunks is performed by a DVR during the recording process, at which time accompanying information such as a text file is generated and stored in memory with the video file to indicate how many chunks of video have been recorded and the length of each etc. The DVR may also process the video file so that it is ready to be transferred to the server 314, e.g. modification of resolution, bit rate, compression etc. The client 312 may then connect the storage device in the VCU 370 to the client computer 328 and login to a web application hosted by the web server 434. Once logged in, the client 312 may then choose an upload interface (described below). The web server 434 in this example does not actually receive the video upload but rather initiates the upload process by launching a redirection tool, such as an ActiveX control on the client computer 328. If the redirection tool has not been previously installed, the web server 434 assists the client computer 328 in downloading and installing the necessary tool. The redirection tool is used to set up a file transfer to the video storage module 338, which as shown in FIG. 18, resides at an entity which is dedicated to data storage and is separate and distinct from the web server 434.

To begin the upload, the user may be prompted to indicate which video file in the storage 326 is to be sent to the video storage module 338 at the server side. The user inputs the path to the accompanying information (e.g. text file) that contains a list of the file names corresponding to the recorded chunks in chronological order. This is used to select all chunks associated with the upload. Before uploading begins, the user may also be presented with an opportunity to trim the video file from either end. For example, the user may wish to trim the first 30 minutes and the last 15 minutes to remove unnecessary footage. For example, the user may capture video content that they do not necessarily need to account for set up and take down time. In this way, a 2 hour study from 8 am to 10 am can be obtained from 7:45 am to 10:15 am and the ends trimmed to ensure the actual study is the only video content analyzed. After trimming, the user may then initiate the upload process by selecting the appropriate option.

The upload process in this example initiates a thread that creates a TCP connection to a server machine at one of possibly many storage nodes 440 in a DCS 430, detail of which is provided below. Beginning with the first chunk of the video file, an HTTP request header is constructed that conforms to parameters dictated by the receiving storage node 440, including the bucket where it should be stored and a key indicating the name the file will be mapped to. After the request header is sent, the transfer of the request body begins, which is a bit-stream of the video file being uploaded. While uploading the request body, the ActiveX control simultaneously waits for an HTTP response from the server at the storage node 440 indicating either that the uploading of the request body can continue or that an error has occurred and transfer of the request body should stop. If no response is received within a certain time limit, it may be assumed that the error has occurred and the transfer is timed-out. Once the request body is successfully uploaded, the ActiveX control selects the next video chunk for the specified video file and constructs the next request etc. This process repeats until all chunks and any other relevant accompanying information are uploaded. During the upload process, a popup may be presented to the user containing a progress bar and estimated time to complete the upload of all files relevant to the study.

It will be appreciated that the above transfer process from the client 312 to the video storage module 338 is only one example of one efficient way to insert a video file into the server's video analysis queue 340 and other tools, mechanisms and steps may be performed to suit different applications and different client and server types.

The report interface 336, shown on the client computer 328, is also provided in the web application hosted by the web server 434. The report interface 336 is in general any interface by which the client 312 gains access to the information generated from the data extracted during the video analysis stage 342 as well as reports generated therefrom. The report interface 336 can be used to organize the results so that the user at the client 312 can select a set of data for which they would like to see a predefined report. In the context of traffic data, the report could be for an intersection count, roundabout or highway. In a retail setting, the reports may pertain to the number of users following a specific path, conversion rates, etc. The client 312 can be given access to the reports and other information by querying a database that stores the result data 354. The database would receive the query and send back the report to the client 312 through the web server 434. The client 312, using the client computer 328, can organize and display the data in the form of a printable report.

Turning back to the overall server system 314, it can be seen in the example shown in FIG. 18 that the server 314 utilizes several distinct back-end devices or entities to distribute processing and administrative tasks, the web server 434 being one of the entities. An intermediary server 432 is used to coordinate activities and manage the process, including collection of revenue (if applicable). The DCS 430 is used as a scalable source of data storage and processing power. In general, the DCS 430 comprises one or more data storage nodes 440 (as noted above) and one or more data processing nodes 441. In this example, the configuration process 356 is performed by one or more administrators at one or more configuration sites 442 that are tasked with generating configuration settings 344 for the videos that in general tell the video analysis module 342 what to look for and how to analyze the video file. Similarly, the post processing stage 350 is performed by one or more individual devices 446 at one or more post processing sites 444 running a post processing or "QA" tool 448 for reviewing the data that is extracted from the video file, to verify the integrity of the data with respect to what is actually seen in the video, and correct any errors that have been found. The intermediary server 432 comprises a synchronization module 433 which provides access to a copy of the video content and extracted data for the post processing stage 350 and access to a copy of the video content for configuration process 56. The web server 134 also communicates with the intermediary server 432 so that the intermediary server 432 is notified when a new video file has been uploaded to the storage node 430 and where it is being stored. The video files, once uploaded, may be stored with the accompanying data in a folder which is referenced uniquely by an identifier. The identifier can be provided to the intermediary server 432 by the web server 434 to enable later access to the video file.

The intermediary server 432 oversees and coordinates use of the DCS 430 and has access to copies of the video files and the configuration settings 344. Preferably, the DCS 430 is a virtualized system that is potentially limitlessly scalable to enable more storage and processing capability to be added to increase capacity in step with demand from the clients 312.

As noted above, the intermediary server 432 is notified by the web server 434 when a new video file has been uploaded to the video storage module 338. The video file enters the video queue 340 to await the configuration settings to be generated. The video queue 340 may simply be a conceptual module in that it may exist as a list that is referenced to determine the next video file to access for configuration 356 and/or video analysis 342. As can be seen in FIG. 18, the configuration administrator(s) 442 are connected to or otherwise have access to the intermediary server 432. Upon determining that a particular video file is ready to be configured, in most cases, any time it is in the video queue 340, the intermediary server 432 connects to the appropriate storage node 440, provides the corresponding identifier, and the video file is retrieved.

To optimize the configuration process 356, the intermediary server 432 preferably obtains a downsampled or otherwise compressed or size-reduced copy of the video file, typically by obtaining an image or series of images from the video file. The series of images are then stored in the video compression module 348, using the synchronization module 433, and provides the administrator 442 with access to the image(s). The administrator 442, using a PC 446 running a configuration tool 450, may then perform the configuration process 356. In general, the configuration process 356 involves generating configuration settings 344 that tell the video analysis module 342 what to look for according to the nature of the video content. The configuration tool 450 is preferably an interactive and graphical API that enables the administrator 442 to view the video and select parameters. Similar to the other entities on the server side 314, the administrator 442 is often remote from the other entities and communicably connected through a network 316 such as the Internet. Further detail pertaining to the configuration process 356 and the configuration tool 450 is provided below.

The configuration process 356 generates configuration settings 344 for the particular video file, which are stored at the storage node 440. The video file would then remain in the video queue 340 until the appropriate processing node 441 is available, at which time the video file and the configuration settings 344 for that video file are copied to the video analysis module 342 at the appropriate processing node 441. It will be appreciated that many processing nodes 441 may be utilized, each performing specific tasks or provisioned to perform various tasks. Such organization can affect the throughput of the video analyses and thus the intermediary server 432 oversees the workflow to, from and within the DCS 430 and provisions more or fewer storage and processing nodes 440, 441 as needed. As can be ascertained from the connecting arrows in FIG. 18, the copies of the configuration settings 344 and the video file can be copied from the storage node 440 to the intermediary server 432 and then to the processing node 441 or copied directly from the storage node 440 to the processing node 441. It can be appreciated that the file transfer mechanism used is dependent on which common network(s) are available to each entity and the nature of the specific application.

For example, the DCS 430 can be configured as an internal set of computing devices at the server 314 or can be outsourced to utilize any one of various available distributed computing or "cluster" computing solutions such as those provided by Sun Microsystems™, IBM™, Amazon™, Oracle™ etc. In one example, the video analysis 342 process begins by sending a request for a new processing instance to a main processing server 441. The request may include meta data that can be interpreted by the instance such as the location and/or key of the video file. If the request is successful, a virtual operating system can be booted and a pre-compiled file system image downloaded from a storage server 440 and mounted on the root directory. The last initialization script may then download and install the analysis code base provided in the configuration settings 344 from the storage server 440 and also download the video file from the storage server 440 based on the user parameters passed to the instance. The user parameters can be retrieved by sending a web request to the main processing server 441. The initialization script in this example then launches the main analysis binary which passes in the locations of the video file and configuration settings 344 as command line parameters. The video analysis module 42 loops through the video file 24 and updates a status file on the storage node 440, indicating a percent completed.

The video analysis 342, examples of which are described above, produces a set of extracted data 349 that is stored in the data storage module 346 at the storage node 440. In one example, the extracted data 349 comprises tracks stored in an XML file, wherein the file stores the track for a given object in the video file by storing a series of points and frame numbers. A downsampled or compressed version of the video file 324" is also generated and stored in the video compression module 348. The extracted data 349 stored in the data storage module 346 is then synchronized to the intermediary server 432 using the synchronization module 433. This tells the intermediary server 432 that the video file has been analyzed and can be subjected to post processing 350. As indicated by the dashed arrow in FIG. 18, in another embodiment, rather than or in addition to storing the extracted data 349 and the compressed video file 24" at the storage node 440, the extracted data 349 and the video file (compressed or uncompressed) may utilize a direct link between the processing node 441 and the post processing entity 446 so that they are immediately available for post processing 350.

Copies of the compressed video file 24" and extracted data 349 (in an appropriate format such as XML) are then provided to an available QA device 446, at which time the post processing stage 350 may commence. The post processing stage 350 produces, if necessary, a modified set of extracted data 349', wherein any errors have been corrected. The modified extracted data 349' is then sent back to the intermediate server 432 so that it may be redirected to the web server 434 and analyzed by the data analysis module 352 to generate information that can be used in a report or other data conveyance. This information may then be stored in the results storage 354 so that it may be accessed by or provided to the client 312.

Returning to the traffic example, the data analysis module 352 may be used to produce a set of tracks where a track is a series of coordinates indicating where an object is in the frame. Events detected in the video content, e.g. movement of an object, can be compared to expected tracks, which immediately indicates whether the event corresponds to a track and which track it is likely associated with. The expected tracks would typically be given during the configuration process 356 and stored in the configuration settings 344. The results storage 354 in this example can be a database that stores events that occurred in the video. For example, in traffic videos, the movement of vehicles and pedestrians may be stored as well as classification of the vehicles. As discussed above, users at the client 312 can generate reports based on these results.

It can be appreciated that the configuration shown in FIG. 18 enables the intermediary server 432 to monitor the process and to collect revenue and outsource certain ones of the steps to optimize the process. It will be also be appreciated that any two or more of the server side entities shown in FIG. 18 may be consolidated into a single entity to accommodate different business relationships or according to available processing and storage capabilities. For example, the intermediary server 432, if appropriate, may host the web application directly and thus not require a separate web server 434. Similarly, the storage nodes 440 and processing nodes 441 in a smaller application may be provided by a more limited number of machines that perform both storage and processing tasks. Also, the configuration sites 442 and post processing sites 444 may be the same operator at the same machine or may be resident at the intermediary server 432. It can thus be seen that various configurations and architectures can be used to operate the server 314 according to the principles described herein.

Figure 19:
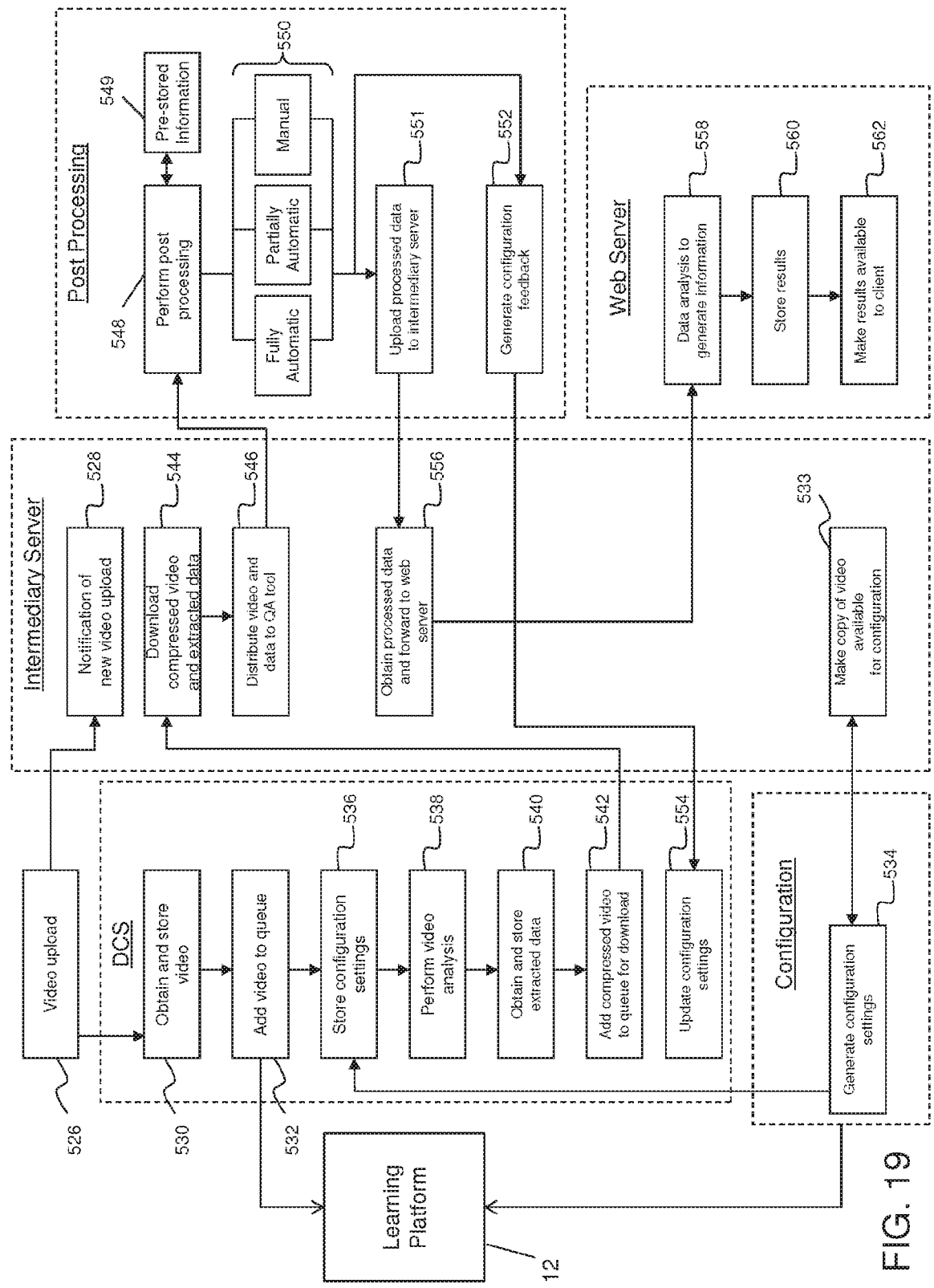
FIG. 19 is a flow chart illustrating computer executable instructions performed by a VIVDS which contributes data to a learning platform.

FIG. 19 illustrates steps performed at the server 314, in this example using the various server devices or entities shown in FIG. 18. Each video file that is uploaded to the DCS 430 at 526 is stored in a video storage module 338 at 530 and added to the video queue 340 at 532. For each new upload at 526, a notification is provided to the intermediary server 432 at 528 so that the intermediary server 434 can coordinate the configuration and analysis of new incoming video as well as schedule and collect revenue, initiate billing etc. While the video file is in the video queue 340 waiting to be analyzed, it is configured by an administrator 442 at 534 to generate the parameters and configuration settings 344 to be used by the video analysis module 342. As shown, in order to configure the video file, the configuration entity 442 first accesses the frame(s) 24' that have been made available by the intermediary server 432 at 533.

The configuration settings are then stored at 536, in preparation for the video analysis stage 342, which is performed at one of the processing nodes 441. Copies of the video file, and configuration settings 344 are then transferred to an available processing node 441 and the video analysis 342 is performed at 538. The extracted data 349 generated during the video analysis stage 342 is then transferred back to the storage node 440 to await post processing 350. The compressed or downsampled video 24" is either generated at this time or an already generated version obtained from the video compression module 348. The data storage module 346 stores the extracted data 349 associated with the video file at 540 until it is downloaded for the post processing entity 444. The compressed video 24" is added to a queue at 542 until the download occurs.

The intermediary server 436 uses the synchronization module 433 to schedule and coordinate a download to the post processing entity 444. The intermediary server 436 downloads the compressed video file 24" and extracted data 349 at 544 and distributes them to an available one of the post processing devices 446 at 546. Using the QA tool 448, the post processing stage 350 is performed at 548. As discussed, the post processing 350 may involve different processing streams, for example a fully automatic stream, or a partially automatic stream. One of the streams is selected using the pre-stored information examined at 549 and then performed at 550. The post processing stage 350, as discussed above, reviews the extracted data 349 with respect to what is actually seen in the video to verify the integrity of the video analysis stage 342, and makes corrections to any errors, if found, thus producing, if necessary, a set of modified extracted data 349'. During the post processing stage 350, feedback for the configuration settings 344 may be generated at 552, e.g. according to observations made with regards to the corrections that were required. If such configuration feedback is generated at 552, the post processing device 446 would send a feedback response to the DCS 430 so that the configuration settings 344 can be modified. It will be appreciated that the intermediary server 432 may require the feedback to be channeled through it to control and verify any changes to the configuration settings 344 or the feedback can be sent using some other channel.

Once the appropriate stream of the post processing stage 350 has been completed at 550, the extracted data 349 (or modified extracted data 349') is then uploaded to the intermediary server at 551 where the synchronization module 433 obtains the data 349 at 556 and redirects it to the web server 434, who then processes the extracted data 349 to obtain information which in an appropriate format for reporting at 558 and the results are stored at 560 so that they may be made available to the client 312 at 562.

It has been discussed above that the intermediary server 432 in one aspect, can be used to control, monitor and administer the distribution and outsourcing of tasks while monitoring incoming and outgoing costs related to the video analysis service conducted by the server devices on behalf of the client 312. As noted above, the configurations described herein are particularly suitable for offloading responsibility from the client 312 so that dedicated equipment and staff are not needed in order for a client to obtain a sophisticated analysis of video content.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10 (e.g., the learning platform 12, database 16, pre-processing 26), etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A distributed learning platform comprising at least one processor and memory, the memory comprising computer executable instructions for:
   interfacing the learning platform with a video analysis environment, the video analysis environment being configured to collect data from a plurality of video capture devices in a connected system, to perform a feature analysis on the collected data using at least one classifier to detect and extract features in the video data, and to perform a validation of results of the feature analyses, wherein the validation of results comprises human feedback for one or more of the feature analyses;

obtaining feature analysis and validation results populated in a database by the video analysis environment continually over time;

for new data being added in the database:
identifying an unrepresented sample space;
determining new data samples associated with the unrepresented sample space; and
adding the new data samples to the database;

using the feature analysis and validation results to periodically or continually retrain the at least one classifier in the video analysis environment, comprising:
obtaining validated data having been subjected to at least one feature analysis;
applying at least one pre-processing operation on the validated data;
determining a set of positive samples, a set of negative samples, and a set of features to be analyzed;
creating parallel jobs in a distributed computing environment having a plurality of computing resources;
aggregating results from the plurality of computing resources; and
analyzing the aggregated results to retrain the at least one classifier; and updating the at least one classifier in the video analysis environment to improve subsequent feature analyses.

2. The learning platform of claim 1, wherein the platform is further configured for real-world feedback interactivity for selecting a reduced set of samples from a complete set of samples.

3. The learning platform of claim 1, wherein the platform is configured to enable human intervention to enhance supervision.

4. The learning platform of claim 1, wherein the parallel jobs comprises a boosting based optimization process.

5. The learning platform of claim 1, wherein the parallel jobs estimate a set of optimal feature vectors and a set of discriminant functions using a parallelizable learning algorithm.

6. The learning platform of claim 5, wherein the estimated feature vectors and set of discriminant functions are used for scale invariant multi-class object classification.

7. The learning platform of claim 5, wherein a feature set is derivable using a bank of non-symmetric kernels.

8. The learning platform of claim 7, wherein a number of kernels is an exhaustive set of possible offsets and scales.

9. The learning platform of claim 5, further configured to use at least one unsupervised method to identify relevant data for the learning algorithm.

10. The learning platform of claim 1, further operable to update previously estimated parameters based upon new data.

11. The learning platform of claim 1, comprising access to a number of computing resources allowing for processing of a large feature space.

12. The learning platform of claim 1, further operable for producing a classifier that is operable in real-time through feature dimensionality reduction.

13. The learning platform of claim 1, wherein the unrepresented sample space is determined by identifying edge cases where the classifier used by the learning platform is insufficient to separate classes.

14. A method of performing distributed learning on a distributed learning platform, the method comprising:
interfacing the learning platform with a video analysis environment, the video analysis environment being configured to collect data from a plurality of video capture devices in a connected system, to perform a feature analysis on the collected data using at least one classifier to detect and extract features in the video data, and to perform a validation of results of the feature analyses, wherein the validation of results comprises human feedback for one or more of the feature analyses;

obtaining feature analysis and validation results populated in a database by the video analysis environment continually over time;

for new data being added in the database:
identifying an unrepresented sample space;
determining new data samples associated with the unrepresented sample space; and
adding the new data samples to the database;

using the feature analysis and validation results to periodically or continually retrain the at least one classifier in the video analysis environment, comprising:
obtaining validated data having been subjected to at least one feature analysis;
applying at least one pre-processing operation on the validated data;
determining a set of positive samples, a set of negative samples, and a set of features to be analyzed;
creating parallel jobs in a distributed computing environment having a plurality of computing resources;
aggregating results from the plurality of computing resources; and
analyzing the aggregated results to retrain the at least one classifier; and updating the at least one classifier in the video analysis environment to improve subsequent feature analyses.

15. The method of claim 14, further comprising enabling real-world feedback interactivity for selecting a reduced set of samples from a complete set of samples.

16. The method of claim 14, further comprising enabling human intervention to enhance supervision.

17. The method of claim 14, wherein the parallel jobs comprise a boosting based optimization process.

18. The method of claim 14, wherein the parallel jobs estimate a set of optimal feature vectors and a set of discriminant functions using a parallelizable learning algorithm.

19. The method of claim 18, wherein the estimated feature vectors and set of discriminant functions are used for scale invariant multi-class object classification.

20. The method of claim 18, wherein a feature set is derivable using a bank of non-symmetric kernels.

21. The method of claim 20, wherein a number of kernels is an exhaustive set of possible offsets and scales.

22. The method of claim 18, further comprising using at least one unsupervised method to identify relevant data for the learning algorithm.

23. The method of claim 14, further comprising updating previously estimated parameters based upon new data.

24. The method of claim 14, comprising accessing a number of computing resources allowing for processing of a large feature space.

25. The method of claim 14, further comprising producing a classifier that is operable in real-time through feature dimensionality reduction.

26. The method of claim 14, wherein the unrepresented sample space is determined by identifying edge cases where the classifier used by the learning platform is insufficient to separate classes.

* * * * *